United States Patent
Samsøe et al.

(10) Patent No.: US 10,988,874 B2
(45) Date of Patent: Apr. 27, 2021

(54) REUSE OF USED WOVEN OR KNITTED TEXTILE

(71) Applicant: REALLY APS, Frederiksberg (DK)

(72) Inventors: Klaus Samsøe, Copenhagen Ø (DK); Wickie Meier Engström, Frederiksberg (DK)

(73) Assignee: REALLY APS, Frederiksberg (DK)

( * ) Notice: Subject to any disclaimer, the term of this patent is extended or adjusted under 35 U.S.C. 154(b) by 143 days.

(21) Appl. No.: 15/555,670

(22) PCT Filed: Mar. 24, 2015

(86) PCT No.: PCT/IB2015/052156
§ 371 (c)(1),
(2) Date: Sep. 5, 2017

(87) PCT Pub. No.: WO2016/151363
PCT Pub. Date: Sep. 29, 2016

(65) Prior Publication Data
US 2018/0044825 A1   Feb. 15, 2018

(51) Int. Cl.
*D04H 1/02* (2006.01)
*D04H 1/54* (2012.01)
(Continued)

(52) U.S. Cl.
CPC ............ *D04H 1/02* (2013.01); *B29C 70/465* (2013.01); *D04H 1/4274* (2013.01); *D04H 1/54* (2013.01); *D04H 1/58* (2013.01); *D04H 1/732* (2013.01)

(58) Field of Classification Search
CPC ....... D04H 1/4274; D04H 1/54; B29C 70/465
See application file for complete search history.

(56) References Cited

U.S. PATENT DOCUMENTS

| 3,607,481 A * | 9/1971 | Shinohara ................ D06N 3/14 156/148 |
| 3,978,179 A * | 8/1976 | Sundhauss ............... D04H 1/00 264/109 |

(Continued)

FOREIGN PATENT DOCUMENTS

| DE | 196 12 548 A1 | 10/1997 |
| JP | 2003-201658 A | 7/2003 |

(Continued)

OTHER PUBLICATIONS

International Preliminary Report on Patentability(PCT/IPEA/409) issued in PCT/IB2015/052156, completed Mar. 3, 2017.
(Continued)

*Primary Examiner* — Scott W Dodds
(74) *Attorney, Agent, or Firm* — Birch, Stewart, Kolasch & Birch, LLP

(57) ABSTRACT

The invention pertains to a method of manufacturing a product from used woven or knitted textile comprising vegetable or animal fibres, in particular cotton or wool, the method comprising the steps of: collecting the used woven or knitted textile, granulating the used woven or knitted textile into fibres having an average fiber length of between 3.6 mm and 5.5 mm, mixing the granulated used woven or knitted textile with a thermoplastic fiber based binder, and forming a nonwoven mat from the mixture of the granulated used woven or knitted textile and fiber based binder, the nonwoven mat comprising 59% to 75% of vegetable fiber, or alternatively the nonwoven mat comprising at least 80% animal fibres. The invention also pertains to a product produced by said method.

33 Claims, 9 Drawing Sheets

(51) Int. Cl.
*D04H 1/58* (2012.01)
*D04H 1/732* (2012.01)
*B29C 70/46* (2006.01)
*D04H 1/4274* (2012.01)

(56) References Cited

U.S. PATENT DOCUMENTS

| | | | | |
|---|---|---|---|---|
| 4,875,966 A * | 10/1989 | Perko | ............... | B30B 15/06 |
| | | | | 156/580 |
| 5,585,054 A * | 12/1996 | Evans | ............... | C08J 5/04 |
| | | | | 264/40.4 |
| 5,783,137 A * | 7/1998 | Alives Porta | ............... | B29C 31/08 |
| | | | | 156/219 |
| 6,565,348 B1 * | 5/2003 | Snijder | ............... | B27N 3/28 |
| | | | | 425/209 |
| 2002/0098757 A1 * | 7/2002 | Johansen | ............... | D04H 1/425 |
| | | | | 442/136 |
| 2005/0020171 A1 * | 1/2005 | Yoshida | ............... | D04H 1/541 |
| | | | | 442/327 |
| 2006/0172637 A1 * | 8/2006 | Hosokawa | ............... | B32B 5/26 |
| | | | | 442/1 |
| 2009/0036566 A1 * | 2/2009 | Li | ............... | C08J 5/045 |
| | | | | 523/128 |
| 2013/0005209 A1 * | 1/2013 | Andersen | ............... | D04H 1/4266 |
| | | | | 442/353 |
| 2015/0330001 A1 * | 11/2015 | Coates | ............... | D04H 1/558 |
| | | | | 264/103 |

FOREIGN PATENT DOCUMENTS

| | | |
|---|---|---|
| WO | WO 01/32405 A1 | 5/2001 |
| WO | WO 2010/063079 A1 | 6/2010 |
| WO | WO 2011/068399 A1 | 6/2011 |
| WO | WO 2015/044894 A1 | 4/2015 |

OTHER PUBLICATIONS

International Search Report (PCT/ISA/210) issued in PCT/IB2015/052156, dated Dec. 16, 2015.
Written Opinion (PCT/ISA/237) issued in PCT/IB2015/052156, dated Dec. 16, 2015.

* cited by examiner

REUSE OF USED WOVEN OR KNITTED TEXTILE

TECHNICAL FIELD

The present invention pertains to a method of manufacturing products from used woven or knitted textile, in particular used woven or knitted textile comprising a majority of vegetable or animal fibres, in particular cotton or wool. The present invention also pertains to a product manufactured according to the inventive method.

BACKGROUND OF THE INVENTION

The textile and service laundry industry generates a substantial amount of mostly used woven or knitted fabric material. The used woven or knitted textiles are accumulated from various stages of the manufacturing process and post use, such as used piece of products, trimmings, end pieces, faulty sections, experimental pieces and rejected pieces. At the present time, practically none of these used woven materials are reclaimed or re-manufactured, because there has been no satisfactory method of reclaiming or re-manufacturing them. Rather, they are disposed of in refuse clumps or by chemical or physical means, and as so disposed, they constitute a discarded resource. Furthermore, a large portion of marketed fabric materials, e.g. apparel, household textiles such as towels tablecloths and spreadsheets, and textiles from industrial laundries, which are ultimately down-cycled as waste for incineration, road filling or wiper products, would be suitable for manufacturing if a practical method of reclaiming, reprocessing and up-cycled re-manufacturing of these materials were available, but no such method is presently available.

Prior art document WO20010063079 discloses a method of forming nonwoven material, the method comprising receiving fibrous material comprising thermoplastic fibres, processing the fibrous material to produce short fibres, adding the short fibres to a preformed web, and heating and optionally compressing the preformed web to form a nonwoven material. The fibrous material concerned is off-cuts and processing wastes of mainly synthetic textile production, not recycled clothing or used textile products.

Prior art document WO0132405 discloses a method of forming a fibre reinforced thermoplastic composite sheet by sourcing waste fibrous material and waste thermoplastic material, producing a flock of the fibrous material and mixing the flock with the thermoplastic material before heating and pressing the mix to form the fibre reinforced thermoplastic composite sheet.

SUMMARY OF THE INVENTION

It is thus an object of the present invention to provide a method of reusing woven or knitted textiles.

It is a further object of the invention to provide a product manufactured from used woven or knitted textile According to the present invention, the above-mentioned and other objects are fulfilled by a method of manufacturing a product from used woven or knitted textile comprising vegetable or animal fibres, in particular cotton or wool, the method comprising the steps of:
collecting the used woven or knitted textile,
granulating the used woven or knitted textile into fibres having an average fiber length of between 3.5 mm and 5.5 mm.
mixing the granulated used woven or knitted textile with a thermoplastic fiber based binder, and
forming a nonwoven mat from the mixture of the granulated used woven or knitted textile and fiber based binder,
the nonwoven mat comprising 59% to 75% of vegetable fiber, or alternatively the nonwoven mat comprising at least 80% animal fibres.

As seen in examples 3 and 5, the proportions given for the fiber contents can provide mechanical properties that allow the nonwoven mat to be used for making a MDF replacement.

The nonwoven mat may define a product which may for example be used for insulation or as an acoustic board.

Hereby is achieved a method by which used woven or knitted textile is transformed into useful products instead of being placed in a landfill or incinerated in a refuse incineration plant, as is customary praxis today.

The use of previously woven or knitted used woven or knitted textile such as used textile (clothes, bed sheets and the like) is in contrast to the above cited prior art.

The used woven or knitted textile is typically sourced from only-cotton or only-wool used textiles. Waste cotton textiles are more readily available and cheaper than waste wool textiles, however wool is the technically better fiber because the interbinding properties of wool fibres are better than cotton. Further wool fibres are more water resistant and more fire resistant than cotton.

Accordingly in some embodiments cotton fibres obtained from granulating cotton waste textiles and wool fibres obtained from granulating wool waste textiles are mixed to obtain a good balance between properties and cost.

The fiber length of 3.5 to 5.5 mm is important for several reasons as will be seen below.

In a preferred embodiment of the present invention the nonwoven mat comprises preferably 59% to 67%, more preferably 63% to 67%, and most preferably about 63% of vegetable fibres. As can be seen from example 3, these ranges provide extraordinarily good mechanical properties when the nonwoven mat is used for producing a MDF-replacement.

In a preferred embodiment of the present invention the method further comprises the step of:
mixing the granulated woven or knitted textile with a coupling agent, and
heating the nonwoven mat to at least 140° C.

This has the advantage of increasing the contact between the granulated used woven or knitted textile, i.e. the fibres, and the fiber based binder. This further increases resistance against swelling caused by exposure to moisture. The coupling agent comprises a hydrophilic moiety for contacting the fibres, and a hydrophobic moiety for contacting the fiber based binder.

The heating step ensures that the coupling agent is coupled to the fiber based binder and the fibres.

The proportion of coupling agent is preferably at least 2%.

In a preferred embodiment of the present invention the nonwoven mat comprises about 3% coupling agent. This proportion of coupling agent has been shown to give good properties, see example 4.

In a preferred embodiment of the present invention the coupling agent is Maleic Anhydride Polyethylene (MAPE).

Thus, where the nonwoven mat comprises 59% to 75% of vegetable fiber, or alternatively the nonwoven mat comprises at least 80% animal fibres, the remainder up to 100% is made up of the thermoplastic fiber based binder and the coupling agent (if present).

In a preferred embodiment of the present invention the method further comprises the steps of:
  placing the mat in a preheated three-dimensional mould or a flat press, and
  pressing the mat into a product having a shape determined by the shape of the three-dimensional mould or the flat press.

By granulating the used woven or knitted textile to an average fiber length of between 3.5 mm and 5.5 mm it is possible to form a nonwoven mat having a very fine and homogenous structure, thereby making it possible to press it into shaped products having a high degree of finish. By a thermoplastic binder is meant a binder which can be melted and flow upon heating, and which will re-set upon cooling. This heating and cooling procedure can be repeated.

In a preferred embodiment of the method according to the invention, the step of pressing the mat into a product having a shape determined by the shape of the three-dimensional mould or flat press comprises the substep of heating the nonwoven mat to a temperature beyond the melting temperature of the thermoplastic binder.

In a preferred embodiment of the method according to the invention the collected used woven or knitted textile comprises used woven or knitted cotton textile or used woven or knitted wool textile selected from any of: trimmings, end pieces, faulty sections, experimental pieces and rejected pieces from the textile industry, used textiles, used clothes, used bed linens, used towels, used work uniforms, used upholstery, or used curtains.

The used woven or knitted textile may in some embodiments contain 80 to 100% woven or knitted used woven or knitted textile. The used woven or knitted textile may comprise mixtures of different types of fibres such as for example 90% cotton/10% polyester, 95% cotton/5% lycra, 80% cotton/20% acryl, 90% wool/10% acryl, 70% wool 30% viscose, and 85% wool/15% polyacryl etc.

In a further embodiment of the method according to the present invention the method further comprises the steps of:
  collecting at least a piece of a nonwoven mat manufactured or remanufactured by the method according to the invention, or at least a piece of a product manufactured by the method according to invention,
  granulating the piece into fibres having an average fiber length of between 3.5 mm and 5.5 mm, and
  mixing the granulated piece with the granulated woven or knitted textile.

This is advantageous as it provide a closed loop remanufacturing system where virtually no material is lost. A product manufactured by the method according to the present invention may be recycled, and made into new products, many times.

Specifically the thermoplastic binder already in the product or nonwoven mat may be reused. However, preferably about 5% by weight of thermoplastic binder is added. Additionally, fibres from the granulation of woven or knitted used woven or knitted textile, or fibres from other used woven or knitted textile, may be added.

If products or nonwoven mats comprising different types of fibres are used the resulting product will have a mottled appearance.

The pieces of nonwoven mats and/or the products may for example be collected from nonwoven mats produced during start, cessation or errors of performing the method according to the present invention. Further post processing such as cutting of nonwoven mats and products yields parts of nonwoven mats and product which may be collected.

Specifically a product manufactured according to the present invention may be used as the used woven or knitted textile for manufacturing a new product using the method.

Thus in one scenario the method according to the present invention is used to manufacture (1) a table top of a table. This table is sold to a first consumer in a furniture store, which customer after a period of use discards the table. The table may be discarded at a recycling station or otherwise collected and the tabletop is separated from the other table components. The table top may then be used as the used woven or knitted textile for manufacturing (2) a MDF-like plate according to the method of the present invention. This MDF-like plate may be sold in a hardware store to a second customer who may use the MDF-like plate for building a cupboard. This cupboard may then, as with the table top, be discarded and used as the used woven or knitted textile for manufacturing yet another, and another, product in a closed cycle with little or no loss of material.

Where the used woven or knitted textile comprises pieces of nonwoven mats or products manufactured by the method according to the present invention the used woven or knitted textile may be granulated by a hammer mill.

In a preferred embodiment of the method according to the present invention:
  the step of forming the nonwoven mat comprises the substeps of
    forming a plurality of nonwoven mats from the mixture of the granulated used woven or knitted textile and binder, and
  arranging the plurality of nonwoven mats on top of each other to form the nonwoven mat.

This is advantageous as it allows thicker products to be manufactured from a plurality of thinner nonwoven mats.

As the nonwoven mat is pressed and heated in the three-dimensional mould or flat press, the thermoplastic binder melts and bonds the plurality of nonwoven mats together.

To obtain optimum interfacial bonding between the plurality of nonwoven mats the used woven or knitted textile should be granulated to fibres having an average length of 0.5 mm to 2 mm.

In a refinement of the above embodiment to the method according to the present invention:
  the step of collecting the used woven or knitted textile comprises the substep of:
    collecting a plurality of different types of used woven or knitted textile,
  the step of granulating the used woven or knitted textile comprises the substep of:
    granulating each of the plurality of different types of used woven or knitted textile,
  the step of mixing the granulated used woven or knitted textile comprises the substep of:
    mixing each of the types of granulated used woven or knitted textile with a thermoplastic binder,
  and wherein at least two of the plurality of nonwoven mats are formed from different types of granulated used woven or knitted textile mixed with the thermoplastic binder.

This is advantageous as it allows for forming products which have comprise fibres from different types of used woven or knitted textile in different parts of the products. This may for example be used to produce a product having a thick middle layer of fibres from cotton-containing used woven or knitted textile, which may further be randomly coloured, flanked by thinner layers of fibres from wool-containing used woven or knitted textile, which may be mono-coloured, thus reducing the amount of wool-containing used woven or knitted textile needed to manufacture the product. Such a product may for example comprise 87% cotton and 13% wool.

Thus different layers, i.e. each of the plurality of nonwoven mats may have different colours, comprise different types of fibres from different types of used woven or knitted textile etc. A product in the shape of a plate may for example comprises a plurality of layers. Such a product may be used for a table top or counter top where the layers are visible at the edge of the table to or counter top for providing an aesthetic effect.

In a further refinement of any of the above two embodiments at least one of the plurality of nonwoven mats is pressed separately by performing the steps of:
  placing the one nonwoven mat in a preheated three-dimensional mould or a flat press, and
  pressing the one nonwoven mat into a pressed mat having a shape determined by the shape of the three-dimensional mould or the flat press, before the pressed mat is arranged with the other mats of the plurality of nonwoven mats, whereby the one nonwoven mat is pressed to a density which is different from the density of at least one of the other mats of the plurality of nonwoven mats.

This is advantageous as it gives the different nonwoven mats different densities.

Preferably, this embodiment further comprises the steps of:
  placing the nonwoven mat, comprising the plurality of nonwoven mats, in a preheated three-dimensional mould or a flat press, and
  pressing the nonwoven mat, comprising the plurality of nonwoven mats, into a product having a shape determined by the shape of the three-dimensional mould or the flat press.

The nonwoven mat pressed separately is preferably pressed at a higher pressure than the pressure used for pressing the nonwoven mat made up of the plurality of nonwoven mats.

This allows for manufacturing products having a lightly pressed middle layer having a low density between two highly pressed outer layers having high density. Such a product has a lower weight.

The above further refinement of the method is especially advantageous for manufacturing acoustic sheets or tiles whereby a first nonwoven mat may be pressed at high pressure so as to reduce the thickness of the unpressed nonwoven mat with about 90%, such as from 40-50 mm unpressed to 3-5 mm pressed, whereafter a plurality of mats are arranged on the first mats and the arranged mats pressed together to a thickness of 22-32 mm.

Alternatively each mat may be pressed separately with different pressures whereafter the pressed mats are arranged together and pressed together.

The acoustic sheet or tile produced as detailed above has one hard side and an opposite softer sound absorbing side. Such an acoustic sheet or tile may be used on walls or ceilings and may additionally be used in as a table top for a table with the hard side up and the sound absorbing side down.

Optionally two or more layers of glass fibre weave/fabric or carbon fibre weave/fabric may be arranged as reinforcement between the layers. Each one of the two or more layers should be arranged as close as possible to a corresponding surface of the nonwoven mat or product.

In one embodiment of the method according to the present invention:
  the step of collecting the used woven or knitted textile comprises the substep of:
    collecting a plurality of different types of used woven or knitted textile having different appearances,
  the step of granulating the used woven or knitted textile comprises the substep of:
    granulating each of the plurality of different types of used woven or knitted textile,
  the step of mixing the granulated used woven or knitted textile comprises the substep of:
    mixing each of the types of granulated used woven or knitted textile with a thermoplastic binder,
and wherein the step of forming the nonwoven mat comprises the substeps of:
  forming a nonwoven mat from each of the types of granulated used woven or knitted textile mixed with the thermoplastic binder,
  arranging portions of the nonwoven mats edge to edge for forming said nonwoven mat having a pattern defined by the portions,
and wherein the method further comprises the step of:
  forcing the portions of the nonwoven mats together edge to edge during the pressing of the nonwoven mat.

This is advantageous as it provides a use for smaller lots of used woven or knitted textile. The nonwoven mat when pressed assumes a tile like appearance having a pleasing decorative effect and can be used for example on walls in a kitchen. The portions of the mats may have different shapes and sizes and may further be arranged in other patterns to form symbols or writing.

The different appearance of the different types of used woven or knitted textile may be due to different colours or different types of fibres used to form the used woven or knitted textile.

Each of the types of granulated used woven or knitted textile may further be mixed with the coupling agent described above.

In one embodiment, one or more of the types of granulated used woven or knitted textile mixed with the thermoplastic binder, and coupling agent where present, may be used to form a nonwoven base mat upon which the portions of the nonwoven mats are arranged. During the pressing of the nonwoven mat the portions adhere to the base mat and each other as the thermoplastic binder is melted by the heal from the preheated three-dimensional mould or flat press.

In a further refinement of the above embodiment a nonwoven frame mat defining a central aperture for receiving the portions of the nonwoven mats arranged edge to edge with each is produced from the same type of used woven or knitted textile as the base mat or any of the other types of waste textile. The nonwoven frame part is then arranged on the nonwoven base mat prior to arranging the portions of the nonwoven mats on the nonwoven base mat.

This is advantageous as it simplifies the manufacture of the product by simplifying arranging the portions and by preventing movement of the portions during pressing.

In a first alternative embodiment of the method according to the present invention the used woven or knitted textile comprises a mix of wool and cotton, a mix of different wools including minimum 50% natural fibres, and/or a mix of different cottons including minimum 50% natural fibres.

In a second alternative embodiment of the method according to the present invention,
  the step of collecting the used woven or knitted textile comprises the substeps of:
    collecting a first amount of used woven or knitted textile comprising a majority of cotton, and collecting a second amount of used woven or knitted textile comprising a majority of wool, and:

the step of granulating the used woven or knitted textile comprises the substeps of:

granulating each of the first and second amounts of used woven or knitted textile into fibres having an average fiber length of between 3.5 mm and 5.5 mm, preferably 3.5 to 4.5 mm, and mixing the first and second amounts of granulated used woven or knitted textile.

These two alternative embodiments are advantageous as they extend the more rare and more expensive wool containing used woven or knitted textile using the more common and cheaper cotton containing waste.

Typically the ratio between wool and cotton in the product will be 50% wool and 50% cotton, however the ratio may vary such as 90/10, 40/60, 60/40, 10/90, etc percent wool vs. percent cotton.

Adding the wool to the cotton provides a fire preventive effect associated with the wool.

The products manufactured by these mixes of wool and cotton, or cotton/cotton or wool/wool, have better properties than cotton only products, see example 2-2. These products further have a mottled appearance which suggests that these products could be used as a substitute for marble and ether stones.

In some embodiments of the method according to the present invention the method further comprises the step of:

mixing the granulated used woven or knitted textile with glass fibres.

This is advantageous as it reinforces the product, see example 2-8, and further increases fire resistance.

Preferably the glass fiber is second generation, i.e. recycled, glass fibres. The amount of glass fibres added to the granulated used woven or knitted textile is 3% by weight.

In a preferred embodiment of the method according present invention 50% to 90% of the thermoplastic binder is made up of a recycled polypropylene plastic.

This is advantageous as it reduces the need for virgin thermoplastic binder which thermoplastic binder often comprises virgin, i.e. non-recycled, plastic.

Further the inclusion of recycled polypropylene is beneficial for increasing resistance against swelling caused by exposure to moisture, see example 2-2.

Recycled polypropylene plastic is either a white or black powder or fiber based granulate traditionally used for rotation moulding. As the recycled polypropylene is sourced from all types of polypropylene product having different colours it is commonly colored black by addition of black colorant. Thus the product manufactured by this preferred embodiment of the method according to the present invention has a mottled appearance caused by the black polypropylene plastic. This results in a product which may for example be used as a substitute for stone and which therefore may be used for counter tops and table tops. The use of recycled polypropylene further reduces the cost of manufacturing the product because it is cheaper than virgin thermoplastic binder.

The inventors have further surprisingly found that granulated used woven or knitted textile mixed with a thermoplastic binder made up in part by recycled polypropylene may be formed by air laying.

In some embodiments of the present invention the method further comprises the step of:

positioning a plastic film between the mat and the three-dimensional mould or flat press prior to the pressing.

This is advantageous as it provides a coating on the product, which coating provides the product with a uniform smooth surface. The plastic film may be provided on one or more sides of the product. By using a coloured plastic film the appearance of the product may be changed.

The plastic film may be polylactic acid (PLA) or polyethylene (PE) plastic.

In some embodiments of the present invention the method further comprises the step of:

coating the product with a wax, oil or lacquer.

This is advantageous as it provides the surface of the product with a uniform smooth surface. Further coating, especially when coating with a lacquer, protects the product against swelling caused by exposure to moisture, see example 2-6.

As an alternative, the product, when made from used woven or knitted textile comprising wool, may be coated with lanolin.

It has surprisingly been found that the surface of the products may be printed because it is can be made smooth and hard by pressing with sufficient force. Thus in one embodiment of the method according to the present invention the method further comprises the step of:

affixing a print, preferably through silk screen printing, to the product.

This is advantageous as it allows different aesthetic expressions for increasing usability of the product as well as it increases the possibilities for using the product manufactured by the method according to the present invention as a substitute for other materials.

It has turned out to be advantageous to granulate smaller pieces of used woven or knitted textile in commercially available granulators and hammer mills, because the granulating runs more smoothly without production stops. Accordingly, a further preferred embodiment of the method according to the invention may further comprise the step of cutting the collected used woven or knitted textile into pieces having a maximal length of 30 cm and a maximal width of 30 cm, before commencing the step of granulating said used woven or knitted textile.

According to a further preferred embodiment of the method according to the invention, the granulated textile fibres have an average length of between 3.5 mm and 4.5 mm.

Possible fiber average fiber lengths include an average length of between 3.5 mm and 5 mm, between 3.5 mm and 4.5 mm, or between 3.5 mm and 4.0 mm. Investigations have shown that good results may be achieved with an average fiber size of approximately 4 mm. Accordingly, in one embodiment of the method according to the invention, the used woven or knitted textile is granulated to a size of approximately 4 mm with a low spreading around 4 mm. By a low spreading is meant a deviation of less than 10%-20% from 4 mm.

Preferably all of the fibres have lengths between 3.5 and 5.5 mm, such as between 3.5 and 5 mm and such as between 3.5 and 4.5 mm.

The fibres need to be short and to have a low spreading in order to result in a more homogenous material which therefore can be pressed harder to obtain a higher density and a smoother surface. Furthermore short fibres with a low spreading result in a better distribution of the thermoplastic binder. Short fibres also increase the interfacial bonding "internal bond" between different nonwoven mats in a sandwich product of example 2-2.

Also when cutting the product the short fibres with low spreading yield a cleaner cut. This is in contrast to prior art techniques where a shredder is used to form fibres because the fibres formed by a shredder are longer and less homogenous. A shredder uses a rotating steel cylinder hearing knives for granulating used woven or knitted textile fibres with a wide spread of different average lengths. In the prior art such fibres are useful for spinning new thread for weaving or knitting, or for being used as stuffing in pillows.

In a further embodiment of the method according to the invention, the step of mixing the textile fibres with the binder may comprise the substep of mixing said textile fibres and the binder in a ratio such that the binder will constitute between 10% and 30% weight of the finished mixture. Depending on cotton or wool, amount (and type) of binder and coupling agent used may be conveniently chosen in dependence of what kind of product is to be produced by the method according to the invention. For example, if hard plates suitable for replacing osb plates or plywood plates are to be produced, then a larger proportion of binder is to be used than that which is necessary in order to produce different products. The amount and type of binders and coupling agent added will thus depend on the intended use of the final product.

In a further preferred embodiment of the method according the invention, the fiber based binder may comprise fibres of thermoplastic, i.e. plastics that melts at asset temperature and then resets upon cooling. The binders may also be provided in the form of synthetic fibres, for example bi-component fibres consisting of polypropylene and polyethylene, polyester, vinyl etc. In such a situation the nonwoven mat is formed by heating up to the melting temperature of the plastic, whereby inter-fibre bonds (between the textile fibres) are established.

In order to provide optimal inter-fibre bonds, the fibres of thermoplastics may according to a further embodiment of the inventive method have an average length between 1 mm and 15 mm, preferably between 3 mm and 12 mm.

In a further preferred embodiment of the method according to the invention, the fibres of thermoplastic are at least in part manufactured from reused plastics. Hereby is achieved that a product is produced by the method according to the invention is a 100% recycled product, because only used materials, which otherwise would have been disposed with at a landfill or in a refuse incineration plant, are used as start materials.

In a further preferred embodiment of the method according to the invention, the fibres of thermoplastic are manufactured from renewable natural resources. Hereby is achieved a carbon dioxide neutral product, because both the used woven or knitted textile fibres, which are majorly or substantially 100% cotton fibres, and the thermoplastic is produced from renewable natural recourses.

In a further embodiment of the method according to the invention, the fibres of thermoplastic are manufactured from biodegradable plastics. Hereby is achieved a much more environmentally friendly solution is achieved, where the end product produced by the inventive method is a "Circular" product, i.e. a product which will in a natural way become part of the biological environment from which it is formed. It is understood that by the word biodegradable it is meant degradable by a biological process, e.g. anaerobic or aerobic bacterial breakdown of the product.

The biodegradable binder may in an embodiment be any of the following materials: bio-epoxy, polyhydroxyalkanoates, polylactic acid, polybutylene succinate, polycaprolactone, polyanhydrides, and polyvinyl alcohol.

In order to provide an optimal tradeoff between price, and quality of the end products produced by the inventive method, each of the plastic fibres may in a further embodiment comprise a mix of biodegradable plastic and conventional plastic. In order to provide an optimal tradeoff between price, quality and environmental friendliness of the end products produced by the inventive method said mix of biodegradable plastic and conventional plastic may in a further embodiment be a mix, where the biodegradable plastic constitutes at least 70% per weight of said mix.

In order to provide an optimal tradeoff between price, and quality of the end products produced by the inventive method, the plastic fibres may in a further embodiment comprise a mix of fibres made from biodegradable plastic and of fibres made from conventional plastic. In order to provide an optimal tradeoff between price, quality and environmental friendliness of the end products produced by the inventive method said mix may in a further embodiment comprise at least 70% per weight of fibres made from biodegradable plastic and the remainder being fibres made from conventional plastic.

In a preferred embodiment of the method according to the invention, each of the plastic fibres may comprise a core formed by a first type of plastic and a cladding surrounding the core, which cladding is formed by a second type of plastic, said first type of plastic having a significantly higher melting point than said second type of plastic. Hereby it is possible to form a nonwoven mat by heating the mix of textile fibres and plastic fibres up to and preferably slightly beyond the melting temperature of the second type of plastic (but not up to the melting temperature of the first type of plastic). This first heating step will cause the cladding to melt and form inter-fibre bonds between the individual textile fibres, whereby a coherent mat similar to rock or stone wool is produced. Such a coherent nonwoven mat is easy to handle and place in the matched the three-dimensional mould or flat press before commencing the pressing step. During the pressing step the nonwoven mat is heated to, or preferably beyond, the melting temperature of the first type of plastic, which constitutes the core of the plastic fibres. Hence the core of the plastic fibres will melt during this pressing step and the melted plastic fibres will, when cured, form a matrix embedding the textile fibres.

In a further embodiment of the method according to the invention, the first type of plastic may have a melting point, which is between 30 degrees Celsius and 80 degrees Celsius higher than the melting point of the second type of plastic, preferably between 50 degrees Celsius and 70 degrees Celsius higher than the melting point of the second type of plastic. Because of the great differences in the melting temperatures of the first and second types of plastics, it is hereby achieved a method, which is practically implementable without great risk of overheating (and thereby melting) the core plastics of the plastic fibres during the step of forming the nonwoven mat of textile fibres.

In a further embodiment of the method according to the invention, the first type of plastic has a melting point of between 100 degrees Celsius and 140 degrees Celsius. Hence, the step of forming the nonwoven mat may in a further embodiment of the inventive method compose the substep of heating the mixture of plastic fibres and granulated used woven or knitted textile fibres to a temperature of between 100 degrees Celsius and 140 degrees Celsius.

In a further embodiment of the method according to the invention, the second type of plastic has a melting point of between 150 degrees Celsius and 200 degrees Celsius. Hence, in a further embodiment according to the invention, the step of pressing the nonwoven mat in the preheated matched three-dimensional mould or flat press may compose the substep of heating the nonwoven mat to a temperature between 150 degrees Celsius and 200 degrees Celsius during the step of pressing the mat into the desired shape.

The nonwoven mat is preferably formed in a dry airborne process, which makes it possible to make the fibre mat with greater or lesser degree of compacting and with greater or lesser thickness. It will thus be possible to make the fibre mats with thicknesses from 2-5 mm up to thicknesses of 2-300 mm or even thicker. The density of the manufactured nonwoven fibre mats is in one embodiment 30 grams per cubic meters to 3000 grams per cubic meters or more, or approximately between 70 and 105 kg/m$^3$.

In one embodiment agents imparting to the mat fire retardant properties may be added. Such agents may comprise any of: borax, boric add, aluminum hydroxide, diammonium phosphate, ammonium polyphosphate, ammonium sulphate or others.

In one embodiment the pressing is performed at a temperature between 160 to 200° C. at a pressure of 40-100 ton/m$^2$ for 5-15 minutes. The pressing may further comprise lowering the temperature to below the melting temperature of the thermoplastic binder and allowing the thermoplastic binder to set while pressing. Thus the total time (including cooling time) may be more than 15 minutes.

In a further embodiment of the method according to the invention, the substep of dry forming the mats may comprise blowing the mix of fibres and binder into a forming head disposed above a forming wire, prior to or simultaneously to heating said mixture. In this forming head a number of rollers and spikes aid in disintegrating the textile fibres in order to provide an even distribution of them, when settling on the forming wire, whereby a nonwoven mat having a homogenous and isotropic density distribution.

A further embodiment of the method according to the invention may further comprise the substep of plowing said mixture of fibres and binder into a forming head placed above a vacuum box disposed on the forming wire, where the mixture of fibres and binder is deposited and held by a vacuum.

In the preferred embodiment of the method according to the present invention the nonwoven mat is formed using air laying.

This is advantageous as it allows for forming nonwoven mats having a higher density, and which nonwoven mats may therefore be compressed more to achieve a higher 20-40% higher density in the manufactured product than product manufactured from nonwoven mats formed by other techniques than air laying. Increasing the density leads to stronger products, and where the product is a plate also to a thinner plate which requires less space for transport and storage.

According to preferred embodiment of the method according to the present invention the step of granulating the used woven or knitted textile comprises the substep of processing the used woven or knitted textile using a rasper and/or fine granulator.

A rasper uses a number or adjustable knives to granulate pieces of used woven or knitted textile into smaller fractions.

A fine granulator granulates the used woven or knitted textile down to 3.5-5.5 mm fibres. Fine granulators are primarily used for granulation of tires, cabling, aluminum and plastics. A fine granulator uses a number of adjustable knives and provides for regulating the average length of the fibres.

Where the used woven or knitted textile comprises nonwoven mats or products manufactured by the method according to the present invention a hammer mill may be used to granulate the nonwoven mat or product into fibres.

In a further embodiment of the method according to the invention the preheated three-dimensional mould or flat press comprises first and second complimentary shaped mould or press parts for defining the shape.

This is advantageous as it provides for manufacturing three-dimensionally shaped product which, after the mould or flat press has been cooled down, retain their three-dimensional shape after being removed from the mould or flat press.

The above mentioned and further objects are furthermore achieved by a product, which is manufactured by a method mentioned above and/or any of the embodiments of said method—also mentioned above. Said product may in a preferred embodiment be a plate, a board, a household product, or an acoustic sheet or acoustic tile.

BRIEF DESCRIPTION OF THE DRAWINGS

A further understanding of the nature and advantages of the present invention may be realized by reference to the remaining portions of the specification and the drawings. In the following, preferred embodiments of the invention is explained in more detail with reference to the drawings, wherein.

DETAILED DESCRIPTION

Figure 1:
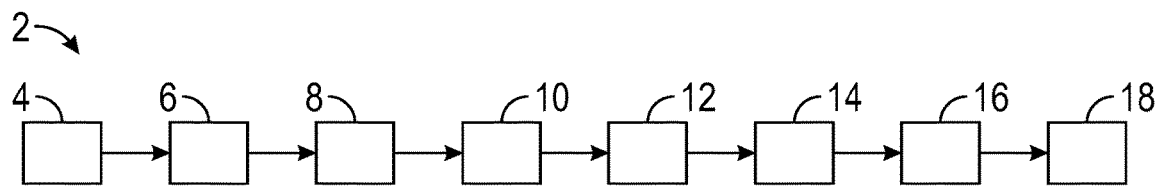
FIG. 1 shows a flow diagram of a preferred embodiment of the method according to the invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughput. Like elements will, thus, not be described in detail with respect to the description of each figure.

FIG. 1 shows an embodiment of a flow diagram, wherein the individual steps of an embodiment 2 of a method according to the invention is schematically illustrated. According to the illustrated method 2 a rigid plate is manufactured from the collected used woven or knitted textile. In the first step 4, used woven or knitted textile comprising a majority of cotton or wool is collected. This collected used woven or knitted textile may comprise any of: trimmings, end pieces, faulty sections, experimental pieces and rejected pieces from the textile industry, fluff from dry cleaning, used textiles, e.g. used clothes, used bed linens, or used curtains. Then in the second step this collected used woven or knitted textile is cut into pieces having a maximal length of 30 cm and maximal width of 30 cm. This prior cutting of the used woven or knitted textile eases the subsequent granulation of said used woven or knitted textile.

Then in the third step 8, the used woven or knitted textile is granulated into fibres baying an average fiber length of approximately 1 mm, preferably with a low spreading around 1 mm. By a low spreading is meant a deviation of less than 10%-20% from 1 mm. The granulation of the used woven or knitted textile may be performed by commercially available fine granulators.

In the forth step 10, said granulated textile fibres are mixed with a thermoplastic binder in the form of fibres made from thermoplastic, where each of said plastic fibres comprises a core formed by a first type of thermoplastic and a cladding surrounding the core, which cladding is formed by a second type of thermoplastic, said first type of plastic having a significantly higher melting point than said second type of plastic.

In order to provide optimal inter-fibre bonds (between the textile fibres), the fibres of thermoplastics have a length between 3 mm and 12 mm. The step 10 of mixing the textile fibres with the binder may comprise the substep of mixing said textile fibres and the binder in a ratio such that the binder will constitute between 10% and 30% weight of the finished mixture. The amount (and type) of binder used may be conveniently chosen in dependence of what kind of product is to be produced by the method according to the invention.

Examples of binders may be fibres of thermoplastic. The binders may also be provided in the form of synthetic fibres, for example bi-component fibres consisting of polypropylene and polyethylene, polyester, vinyl etc. The fibres of thermoplastic may at least in part be manufactured from reused plastics. Hereby is achieved that a product is produced by the method according to the invention is a 100% recycled product, because only waste materials, which otherwise would have been disposed with at a landfill or in a refuse incineration plant, are used as start materials. The fibres of thermoplastic may also be manufactured from renewable natural recourses, whereby is achieved a carbon dioxide neutral product, because both the waste textile fibres, which are majorly or substantially 100% cotton fibres or wool fibres, and the thermoplastic is produced from renewable natural recourses. The fibres of thermoplastic may also be manufactured from biodegradable plastics, whereby is achieved a much more environmentally friendly solution, where the end product produced by the method 2 is a "cradle to cradle" product, i.e. a product which will in a natural way become part of the biological environment from which it is formed. Here, it is understood that by the word biodegradable it is meant degradable by a biological process, e.g. anaerobic or aerobic bacterial breakdown of the product. The biodegradable plastic fibres may be formed from any of the following materials: bio-epoxy, polyhydroxyalkanoates, polylactic acid, polybutylene succinate, polycaprolactone, polyanhydrides, and polyvinyl alcohol.

However, in order to provide an optimal tradeoff between price, and quality of the end products produced by the method 2, each of the plastic fibres may in a further embodiment comprise a mix of biodegradable plastic and conventional plastic. Said mix of biodegradable plastic and conventional plastic may be a mix, where the biodegradable plastic constitutes at least 70% per weight of said mix. Alternatively, the plastic fibres comprise a mix of fibres made from biodegradable plastic and of fibres made from conventional plastic.

Then in the fifth step 12 a nonwoven mat is formed by heating the mix of textile fibres and plastic fibres up to and preferably slightly beyond the melting temperature of the second type of plastic (but not up to the melting temperature of the first type of plastic). This will cause the cladding of the plastic fibres to melt and form inter-fibre bonds between the individual textile fibres, whereby a coherent mat similar to rock or stone wool is produced. For example if the first type of plastic (which constitutes the cladding of the individual plastic fibres) has a melting point of between 100 degrees Celsius and 140 degrees Celsius, the step 12 of forming the nonwoven mat comprises a heating of the mixture of plastic fibres and granulated used woven or knitted textile fibres to a temperature of at least between 100 degrees Celsius and 140 degrees Celsius.

The nonwoven mat is preferably formed in a dry airborne process, which makes it possible to make the fibre mat with greater or lesser degree of compacting and with greater or lesser thickness. It will thus be possible to make the fibre mats with thicknesses from 2-5 mm up to thicknesses of 2-300 mm or even thicker. The density of the manufactures nonwoven fibre mats is in one embodiment 30 grams per cubic meters to 3000 grams per cubic meters or more.

Then in the sixth step 14, the nonwoven mat is placed in a preheated three-dimensional mould or flat press.

In the seventh step 16, the nonwoven mat is pressed into a product having a shape determined by the shape of the three-dimensional mould or flat press. During the pressing step 18 the nonwoven mat is heated to, or preferably beyond, the melting temperature of the first type of plastic, which constitutes the core of the plastic fibres. Hence the core of the plastic fibres will melt during this pressing step and the melted plastic fibres will, when cured, form a matrix embedding the textile fibres. For example if the second type of plastic has a melting point of between 150 degrees Celsius and 200 degrees Celsius, the step 16 of pressing the nonwoven mat in the preheated matched three-dimensional mould or flat press may comprise a heating of the nonwoven mat to a temperature of at least between 150 degrees Celsius and 200 degrees Celsius during the step 16 of pressing the mat into the desired shape, which shape may be a three-dimensional shape of a flat pressed panel.

In the eighth step 18, the product (for example a plate) is removed from the three-dimensional mould or flat press, and excess material is cut and/or trimmed away in order to provide a product having the desired finish.

Figure 11:
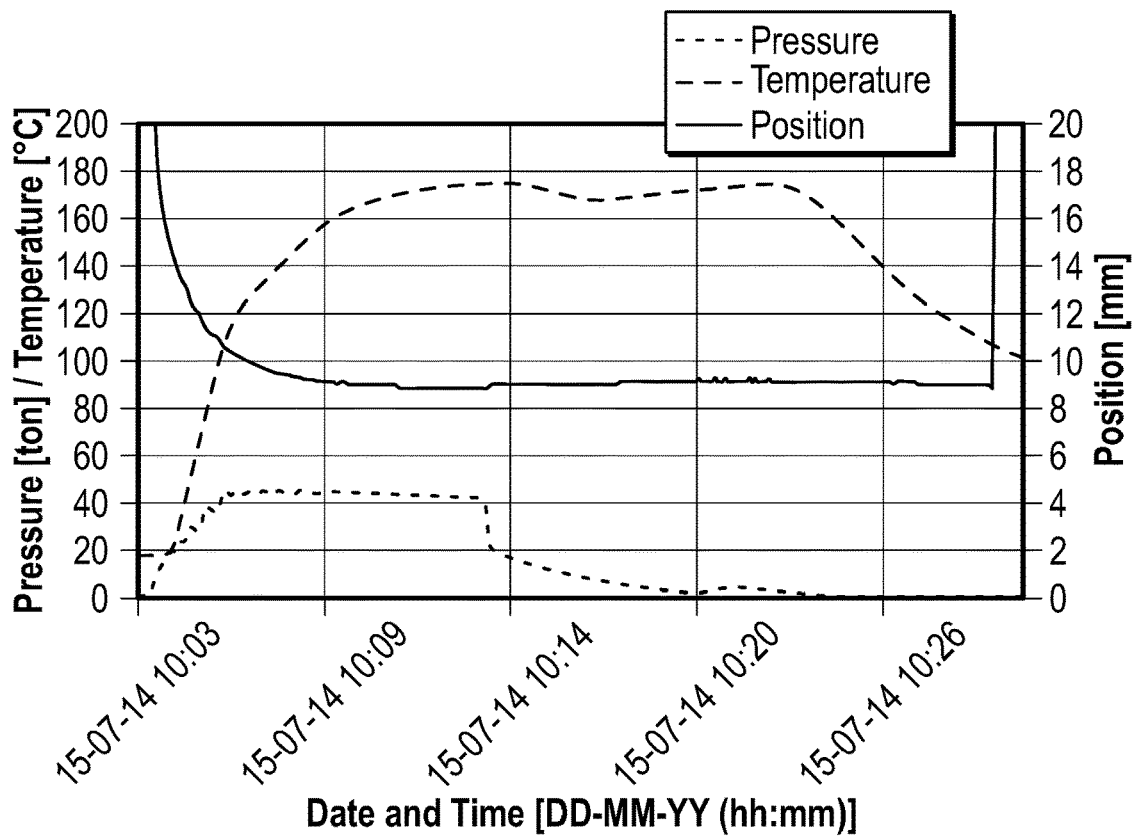
FIG. 11-18 show pressure-temperature-position of different pressure programs.

FIG. 11 shows a vertically and horizontally bonded product having a pattern made up of portions of mats. A base mat 40 is first formed whereafter first to eighth portions 42, 44, 46, 48, 50, 52, 54 and 56 are taken from mats having different appearances as illustrated by the shading. The portions 42 44 46 48 50 52 54 and 56 are arranged on the base mat 40 before the base mat and portions are pressed and heated.

Figure 12:
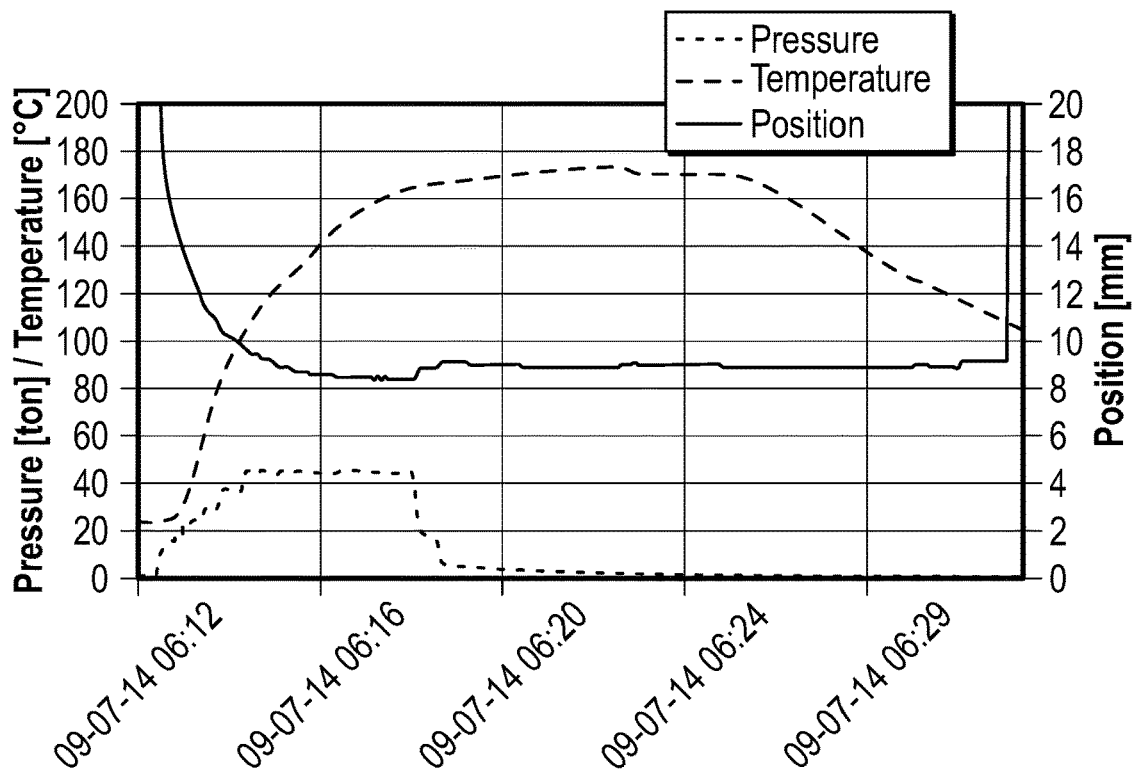
Figure 13:
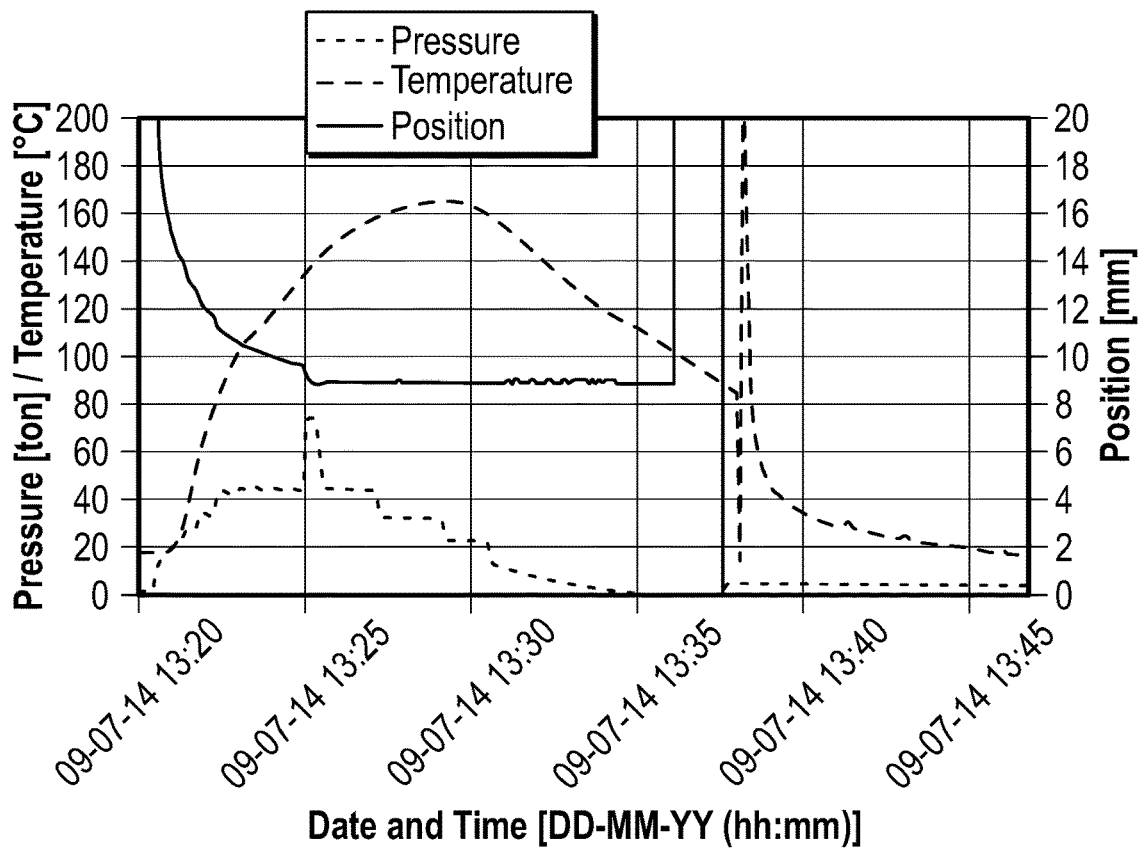
Figure 14:
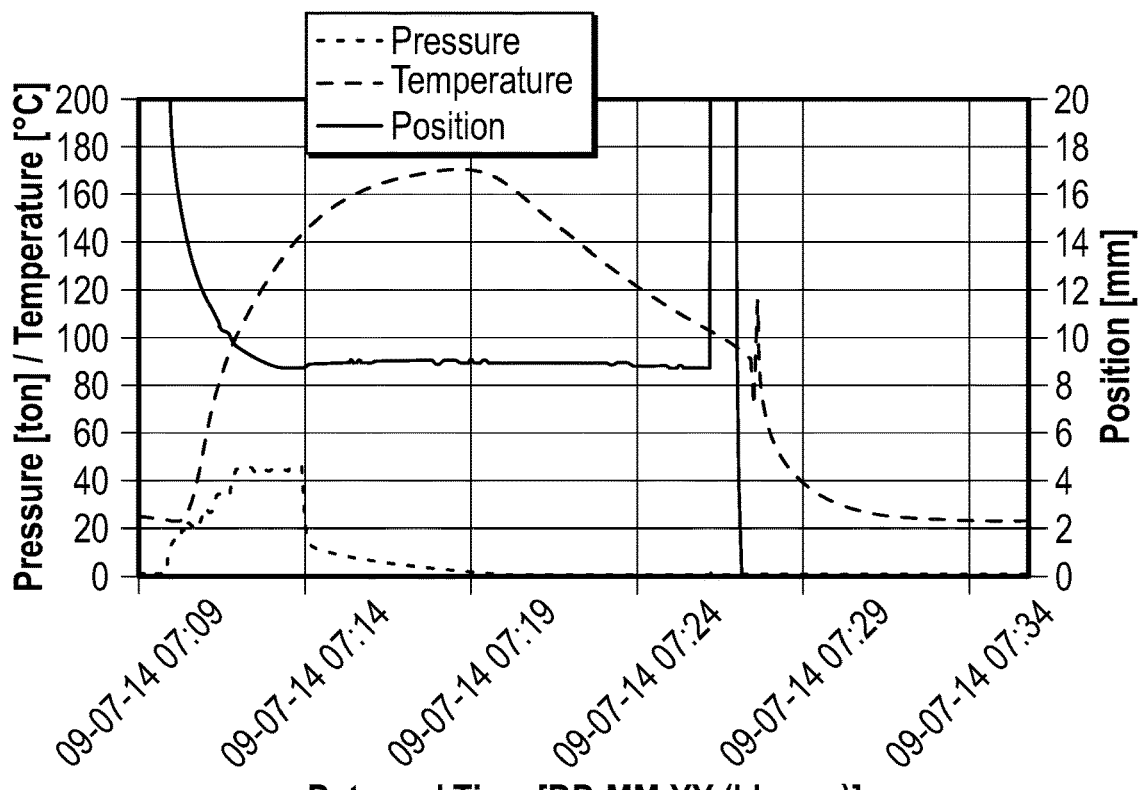
Figure 15:
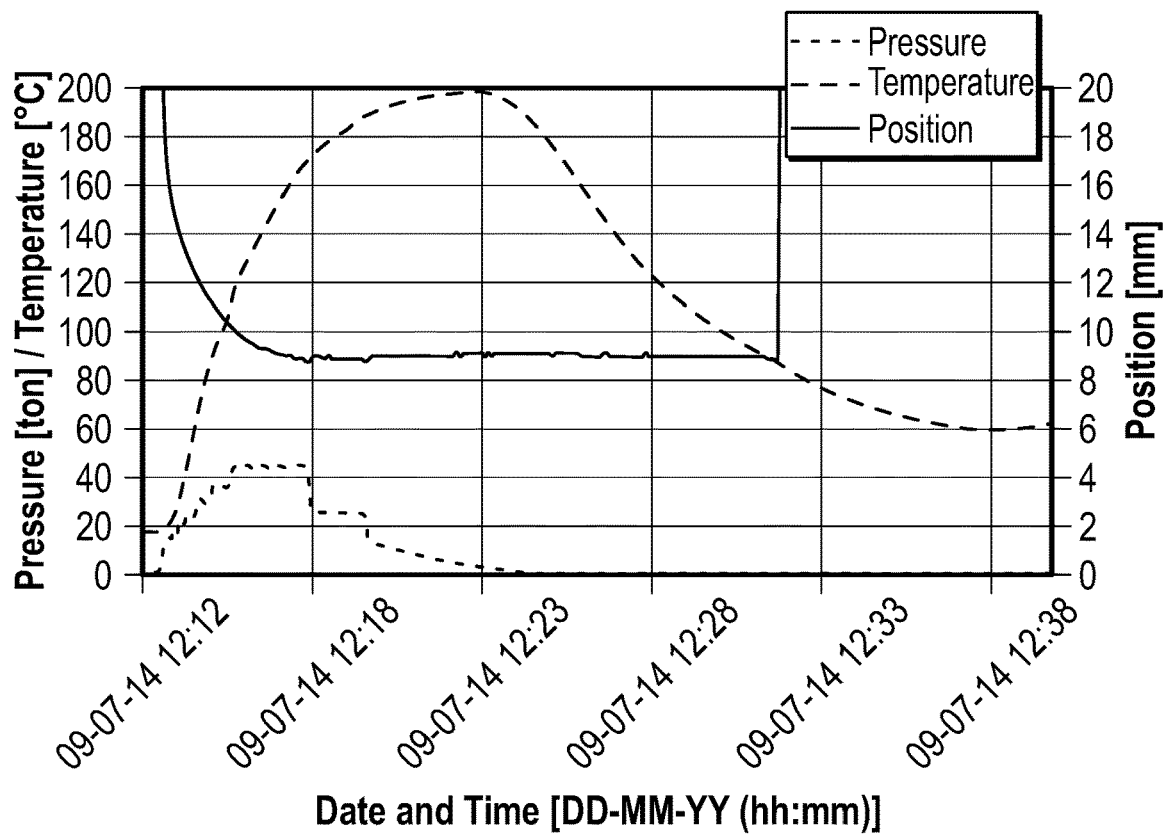
Figure 16:
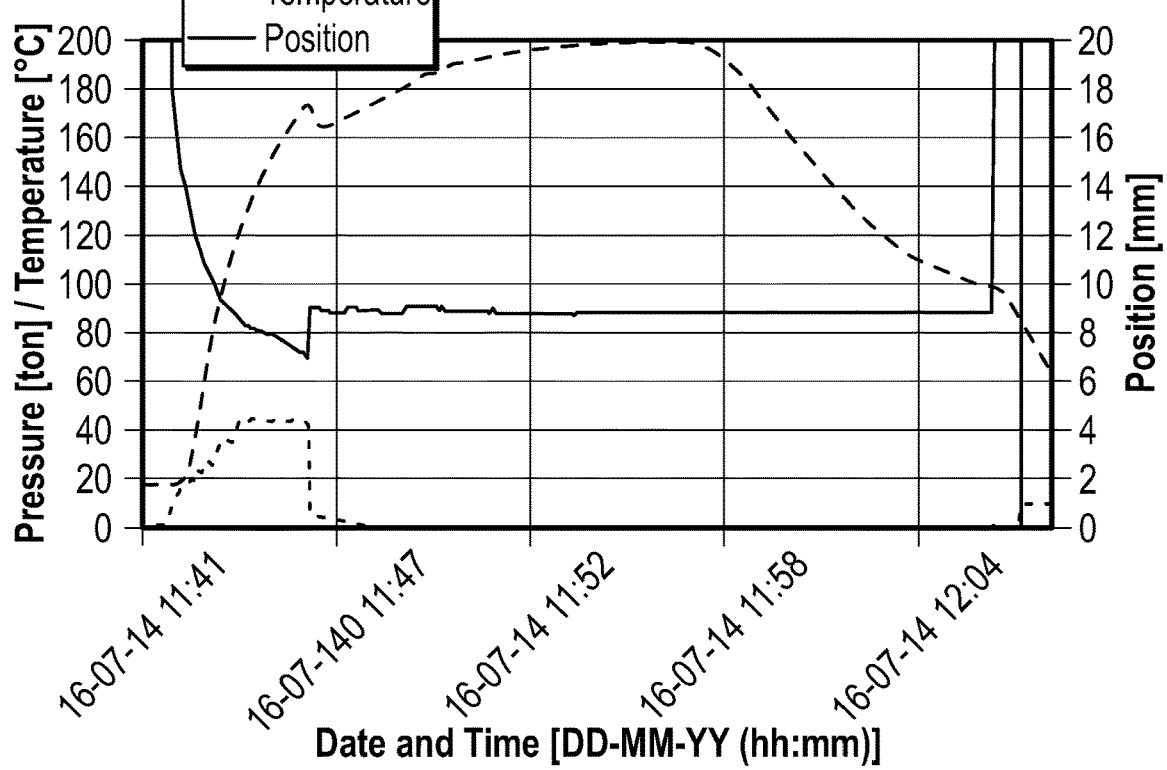
Figure 17:
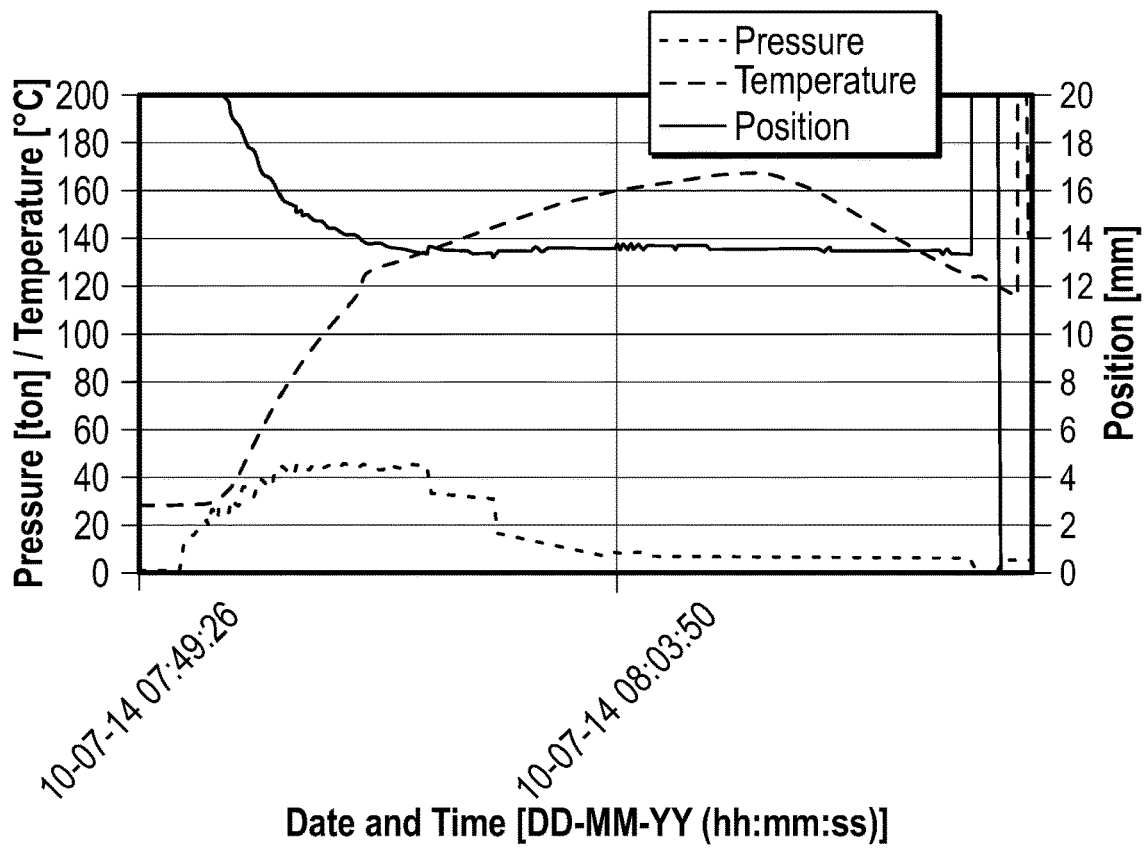
Figure 18:
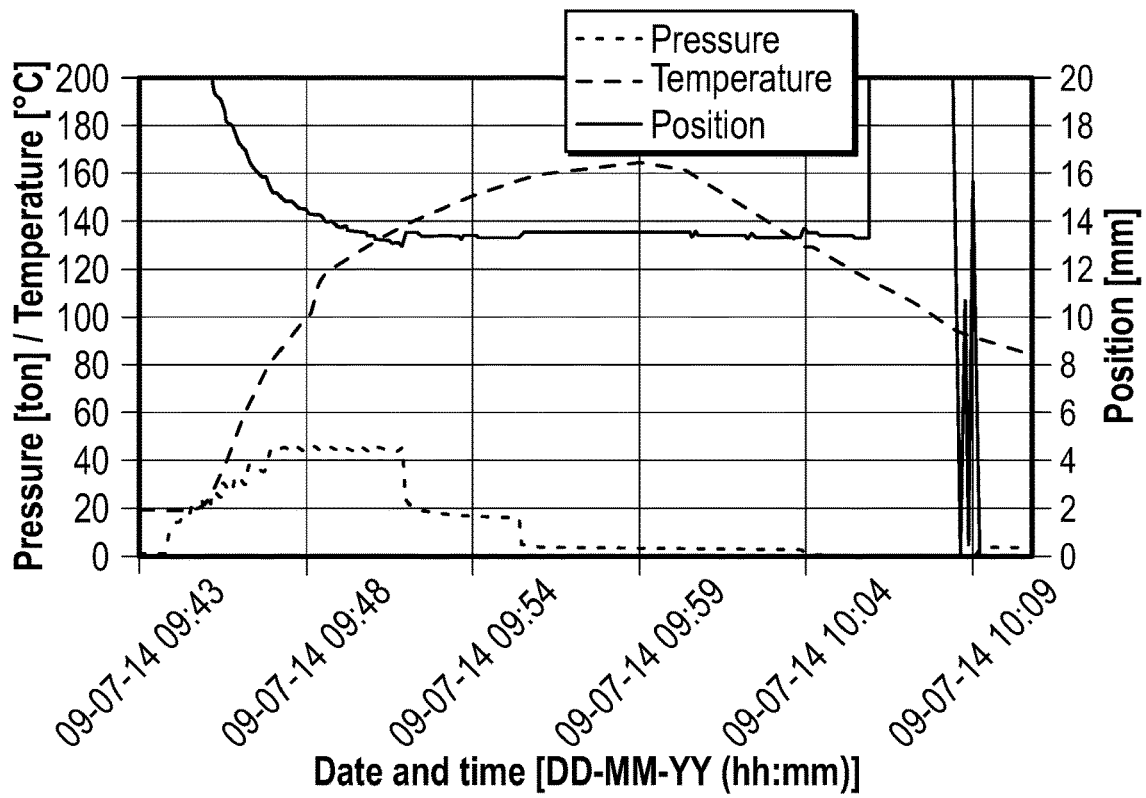

FIG. 12 shows a cross section of an acoustic sheet 60 having a hard layer 62 and a soft sound absorbing layer 64. For manufacturing the acoustic sheet 60 a first nonwoven mat is firstly pressed hard to produce the hard layer 62. Thereafter a second nonwoven mat is placed upon the hard layer 62 and the hard layer 62 and the second nonwoven mat pressed slightly while heated for bonding the second nonwoven mat to the hard layer 62 to form the soft sound absorbing layer 64.

Example 1: Sound Absorption

In the following a series of acoustic tests performed on samples of plates (and nonwoven mats) manufactured in accordance with an embodiment of the inventive method will be discussed. The acoustic tests have been performed by DELTA Akustik. The sound absorption was measured for a sound field having an incidence that is perpendicular to the plates that were examined.

The so called transfer measurement method in accordance with the standard EN ISO 10534-2 was used, where the incidence sound and the reflected sound from a test sample placed in a tube is measured with two microphones. The ratio between these two measurements is characterized by a frequency dependent transfer function. The diameter of the tube implies an upper cutoff frequency, which in this particular setup is 2000 Hz. The measurement accuracy for the complete measurement setup gives a lower cutoff frequency. In the particular system used this lower cutoff frequency is 50 Hz.

Figure 2:
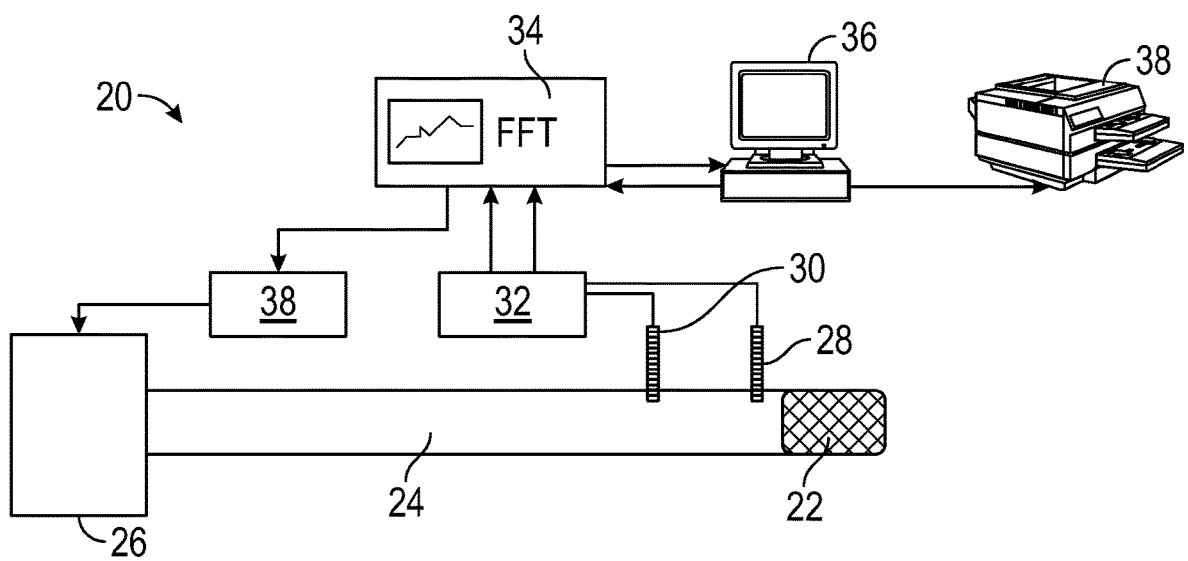
FIG. 2 shows the measurement setup for measuring the absorption coefficient of plates manufactures in accordance with an embodiment of the method according to the invention.
Figure 3:
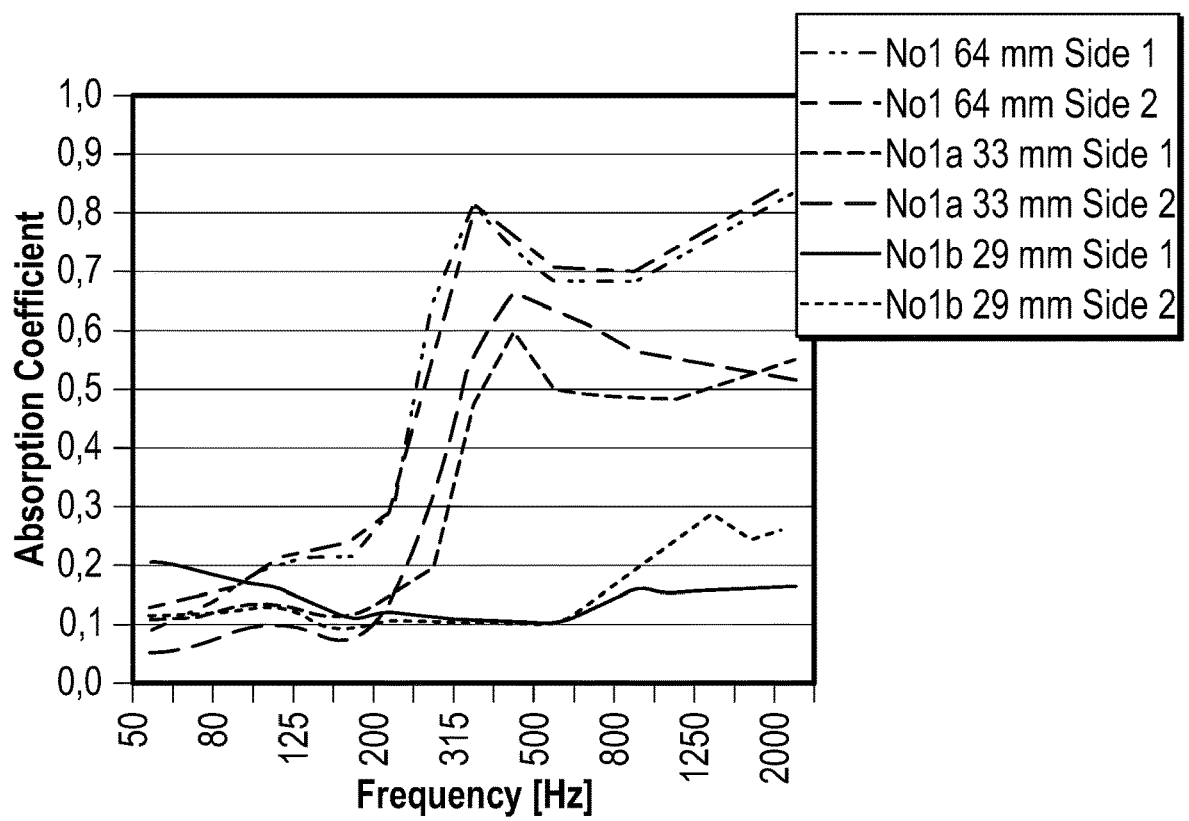
FIGS. 3-8 show the measured absorption coefficient per ⅓ octave for test samples.
Figure 4:
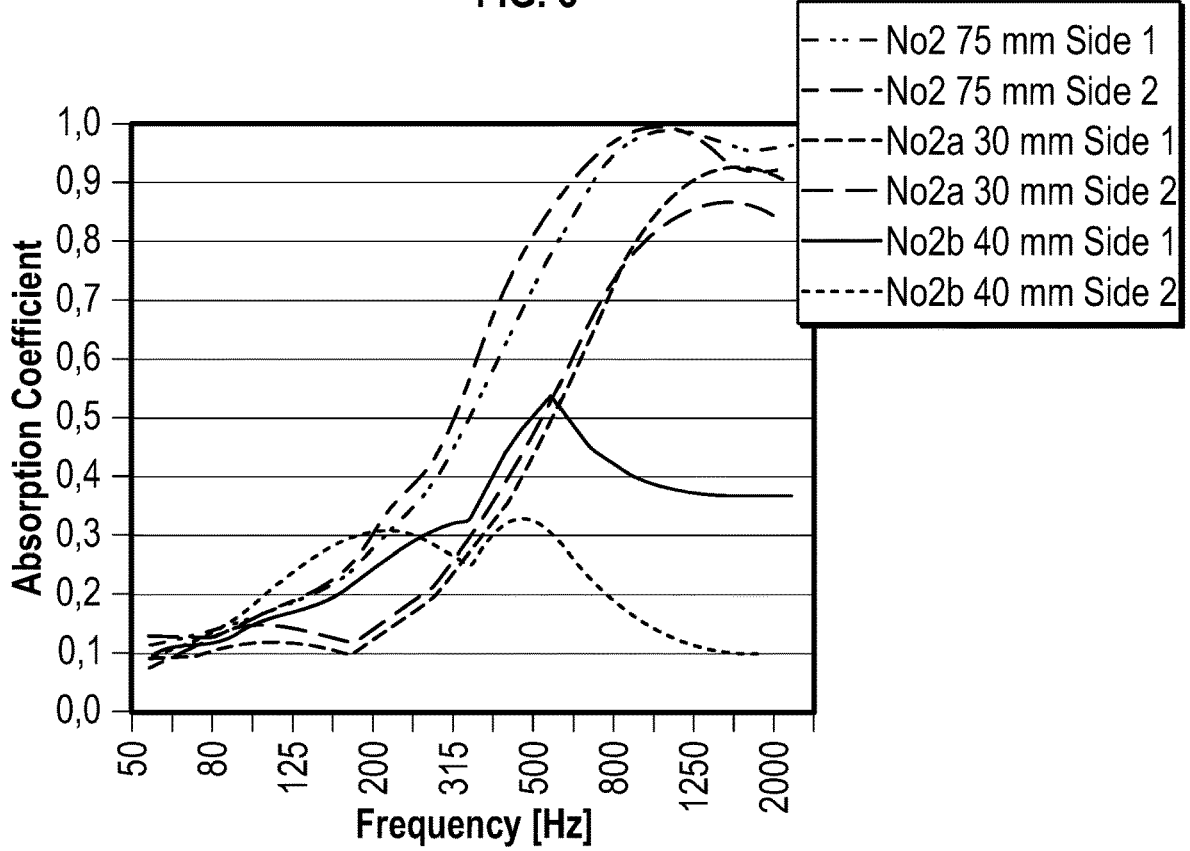
Figure 5:
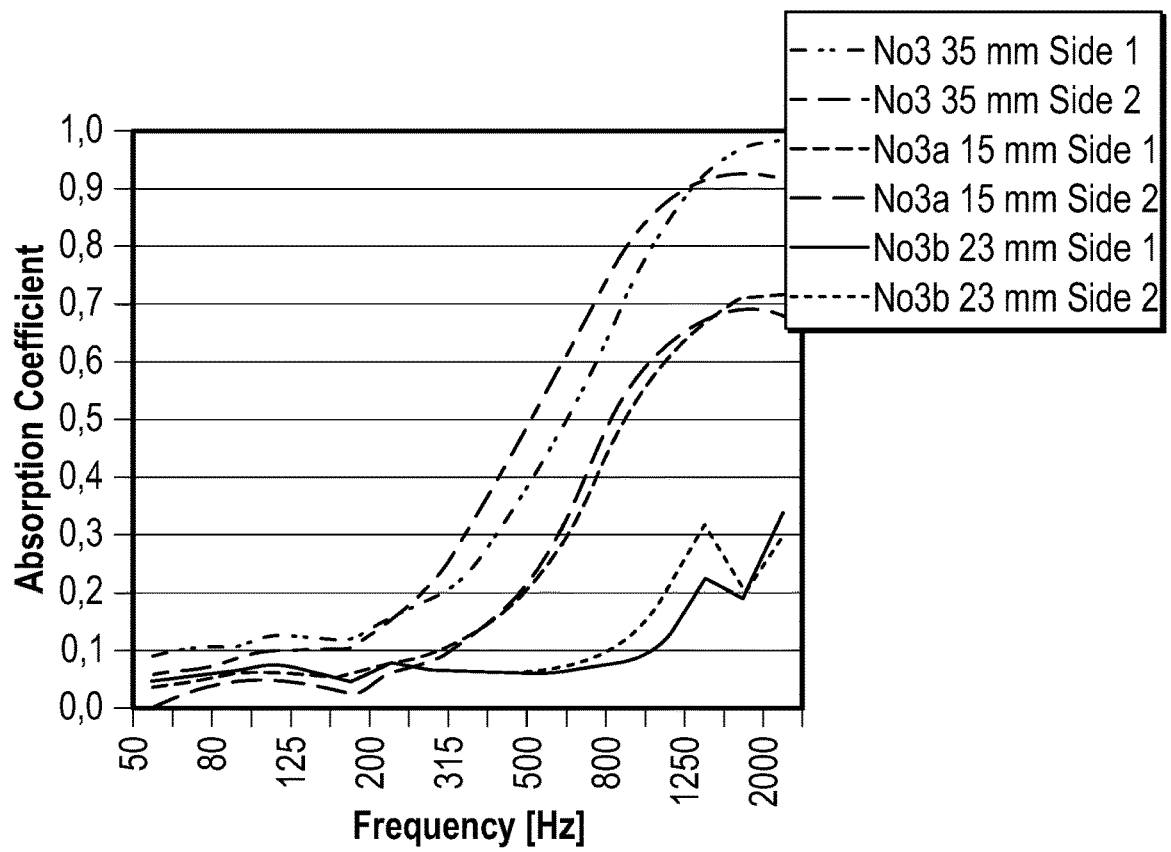
Figure 6:
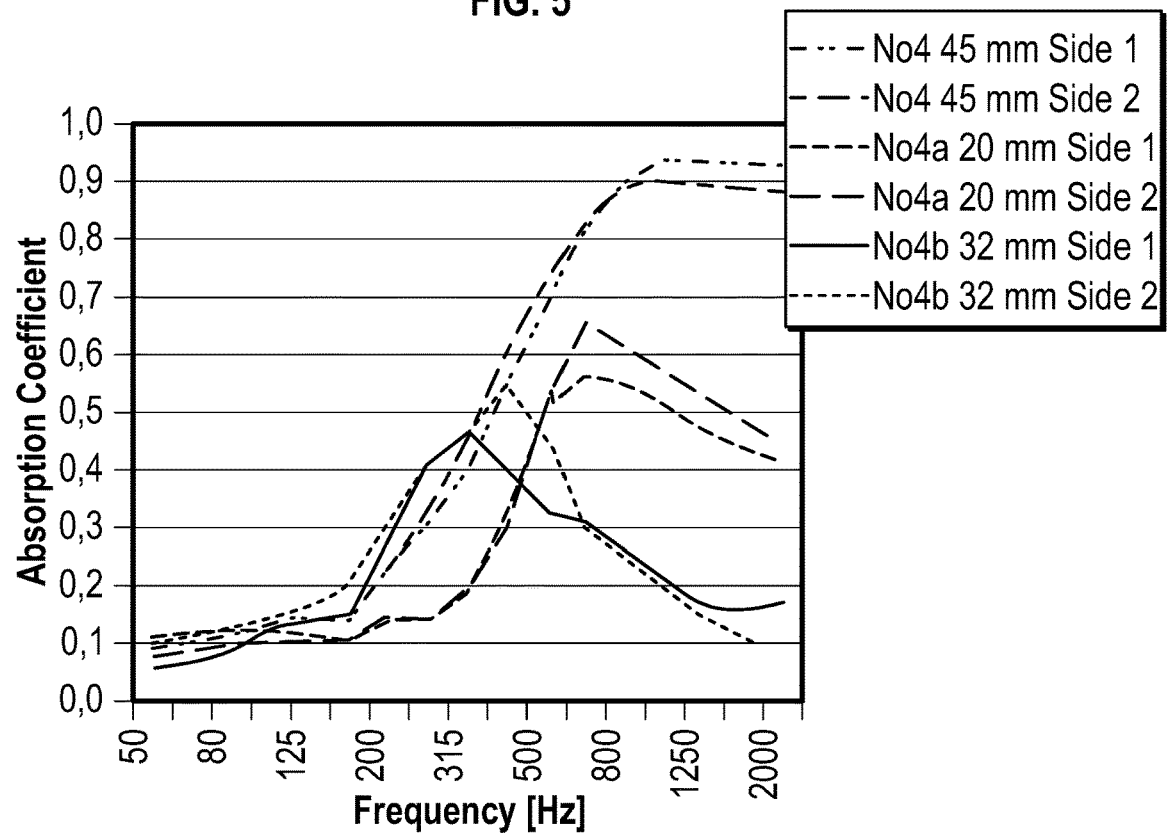
Figure 7:
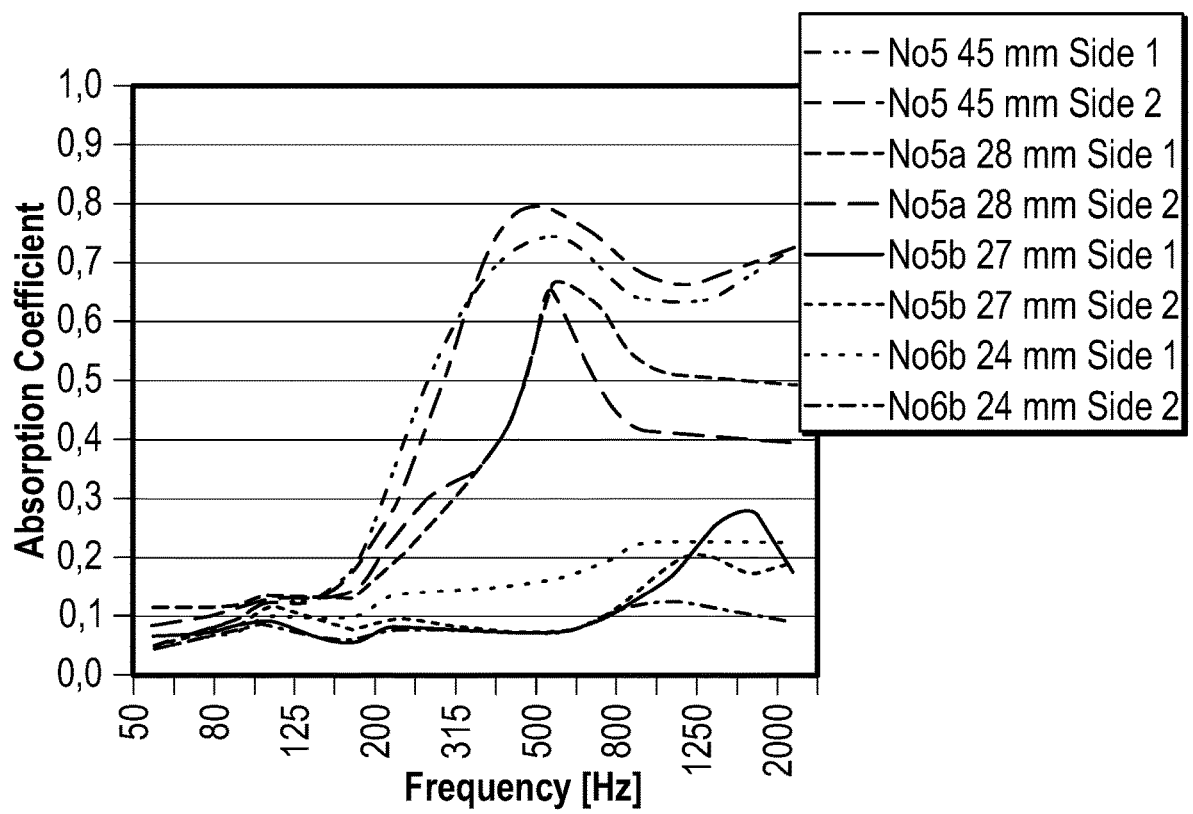
Figure 8:
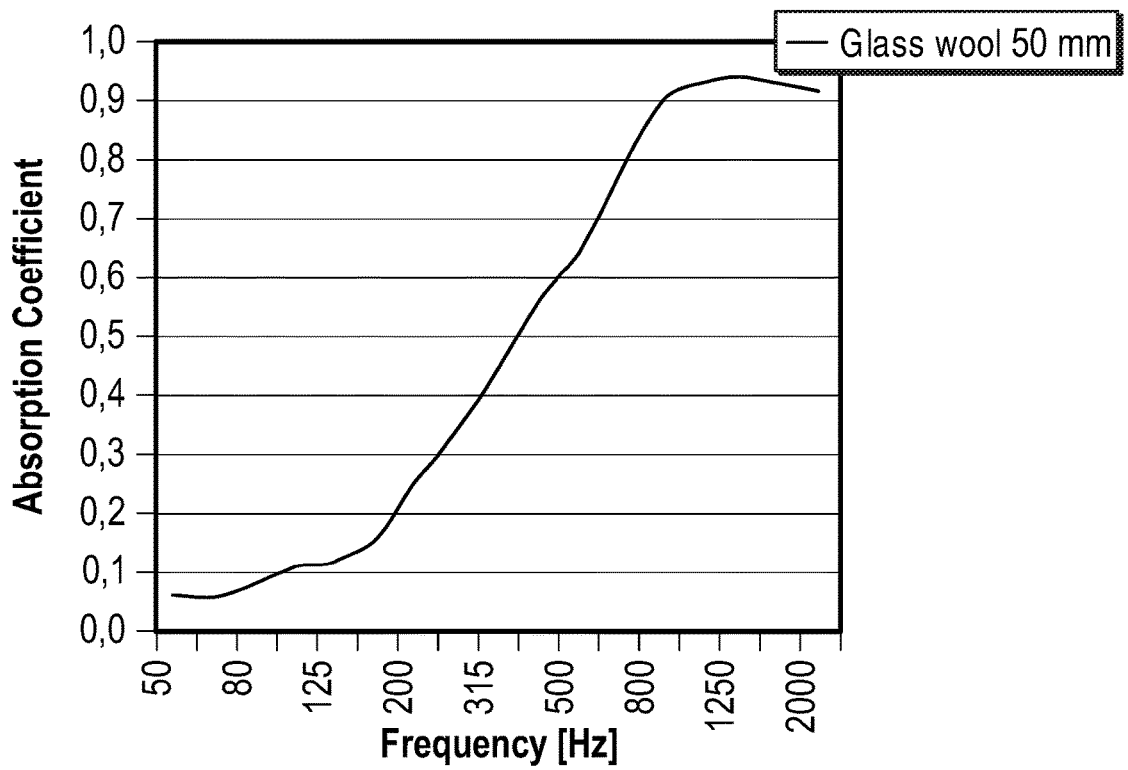
Figure 9:
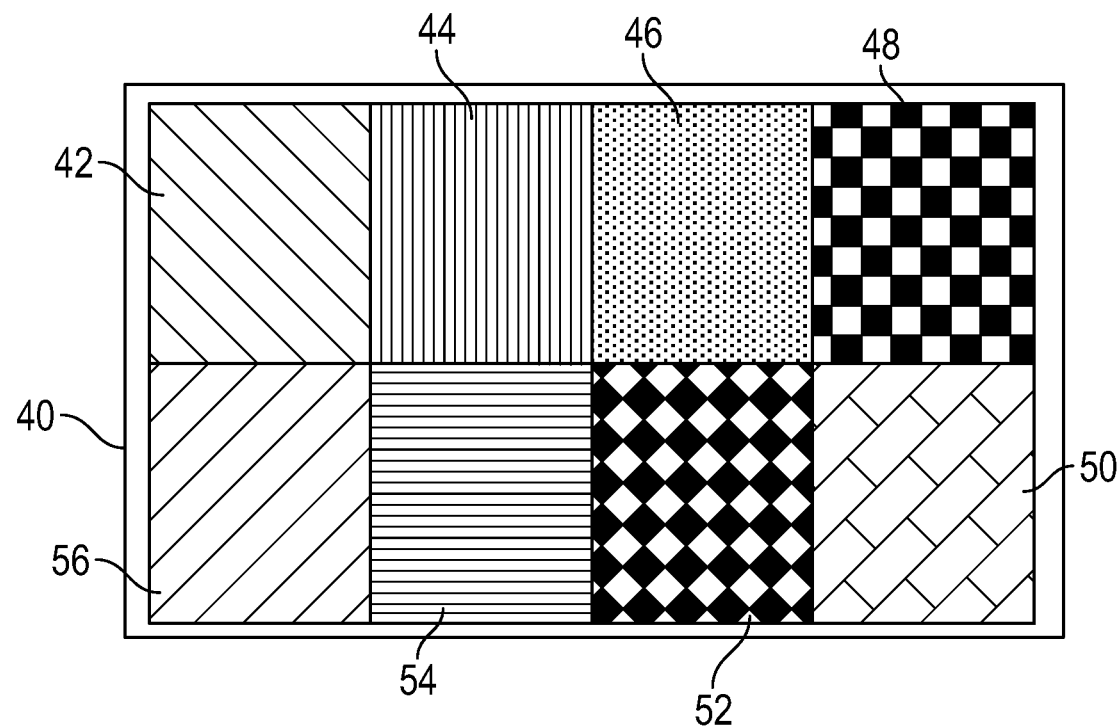
FIG. 9 shows a vertically and horizontally bonded product having a pattern made up of portions of top mats.
Figure 10:
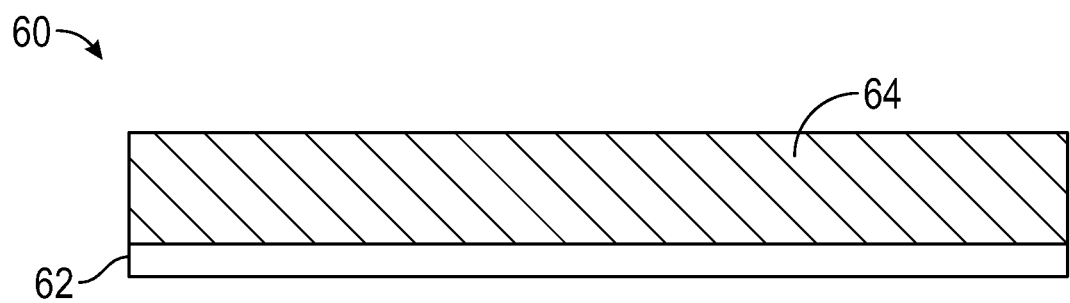
FIG. 10 shows a cross section of an acoustic sheet having a hard layer and a soft sound absorbing layer.

In FIG. 2 is shown a schematic illustration of the measurement setup 20. As illustrated the test piece 22 is placed in one end of a tube 24, which in the opposite end is connected to a sound generator—a speaker 26. The sound is picked up by two microphones 28 and 30, which via an amplifier 32 is connected to a Fast Fourier Transformer 34, which in turn is connected to a computer 36. The computer is connected to a printer 38. The Fast Fourier Transformer 34 is also connected to the speaker 26 via an amplifier 38. Before the measurements of the sound absorption of the test samples are commenced the transfer function for the measurement setup 20 is determined, and the small, but inevitable, phase and amplitude errors in the measurement equipment are minimized by a exchange technique, where the average of two measurements with reversed measurement chains are calculated.

The placement of the test samples within the tube is very critical, because even small cracks and leaks, for example between the test sample and tube, may affect the sound absorption considerably. The leaks between the tube and test samples were minimized by using a special crème as filler between the tube and test sample.

The following measurement equipment was used for the tests:

| Item | Brand | Type no. | DELTA No. |
|---|---|---|---|
| Measurement tube | Brüel & Kjær | — | — |
| Amplifier | DELTA | — | — |
| Microphones | Brüel & Kjær | 4165/4190 | 4213/0694L/1072L |
| Power supply | Brüel & Kjær | 2669 | 1080L/1207L/1215L |
| Calibrator | Brüel & Kjær | 4231 | 118T |
| Spectral analyzer | Brüel & Kjær | PULSE | #2665538 |

By the measurement setup 20, the absorption coefficient is determined with a frequency resolution of 2 Hz in the frequency interval from 50 Hz to 2000 Hz. This frequency interval is determined by the maximal microphone distance and the inner diameter of the tube 24.

In order to provide an estimation of the sound absorption for building purposes, the absorption coefficients have been recalculated to ⅓ octave frequency bands.

Sound absorption of selected samples listed in the table below was conducted using the set up and method described above. The samples used were:

| Sample | Contents | Thickness |
|---|---|---|
| No1 | Nonwoven mat comprising fibres from used woven or knitted textile (lint) from industrial drying machines to which has been added 25% by weight of bicomponent fibres. | 64 |
| No1a | The mat of sample No1 which has been pressed during heating (179° C. at 3 minutes) in a manual press (manual flat bed fusing press/manual heat transfer press) to the stated thickness. | 33 |
| No1b | Four mats of sample No1 which have been pressed during heating to the stated thickness. | 29 |
| No2 | Nonwoven mat formed from sheep wool to which has been added 20% by weight of bicomponent fibres. | 75 |
| No2a | The mat of sample No2 which has been pressed during heating (179° C. at 3 minutes) in a manual press (manual flat bed fusing press/manual heat transfer press) to the stated thickness. | 30 |
| No2b | Four mats of sample No2 which have been pressed during heating to the stated thickness. | 40 |
| No3 | Nonwoven mat formed from fibres of black wool to which has been added 25% by weight of bicomponent fibres. | 35 |
| No3a | The mat of sample No3 which has been pressed during heating (179° C. at 3 minutes) in a manual press (manual flat bed fusing press/manual heat transfer press) to the stated thickness. | 15 |
| No3b | Four mats of sample No3 which have been pressed during heating to the stated thickness. | 23 |
| No4 | Nonwoven mat formed from mixed fibres (granulated earlier produced mats) to which has been added 25% by weight of bicomponent fibres. | 45 |
| No4a | The mat of sample No4 which has been pressed during heating (179° C. at 3 minutes) in a manual press (manual flat bed fusing press/manual heat transfer press) to the stated thickness. | 20 |
| No4b | Four mats of sample No4 which have been pressed during heating to the stated thickness. | 32 |
| No5 | Nonwoven mat formed from fibres from Cotton (Jeans) to which has been added 25% by weight of bicomponent fibres. | 45 |
| No5a | The mat of sample No5 which has been pressed during heating (179° C. at 3 minutes) in a manual press (manual flat bed fusing press/manual heat transfer press) to the stated thickness. | 28 |

-continued

| Sample | Contents | Thickness |
|---|---|---|
| No5b | Four mats of sample No5 which have been pressed during heating to the stated thickness. | 27 |
| No6b | Four mats of green wool to which has been added 25% by weight of bicomponent fibres and which have been pressed during heating to the stated thickness. | 24 |

The absorption coefficient for these samples, and for 50 mm glass wool, is shown in FIGS. 3-8.

From the figures the following conclusions may be drawn:

Samples No2 and No4 have absorption coefficients which match those of glass wool and may therefore be used as a substitute to glass wool for acoustic insulation or acoustic sheets.

Other samples useful for acoustic sheets placed on walls and ceilings include samples No1, No2, No2a, No3, No4, and No5.

Furthermore there is a need for sound absorbing materials which have a good absorption for low frequencies and which have at least passable absorption in the higher frequencies, i.e. do not reflect so much higher frequency sound so as to worsen the acoustic environment in noisy environments. Suitable samples for these type of absorbents include No1a, No2b and No4b.

For use as a sound insulation in partition walls the samples No1, No2, No2a, No3, No4 and No5 could be useful.

Samples No3a, No4a and No5a could possibly be used as floor underlayment to dampen step sound.

Possibly the samples No1b, No3b, No5b and No6b could be used as sound absorbing sheets on partition walls.

Example 2-1: Further Test Samples

Further tests were made on the following samples, as described in the table below, produced by the method according to the present invention.

| Sample designation | Contents of product | Average fiber length |
|---|---|---|
| Sample 1 | Used woven or knitted textile (lint) from industrial drying machines to which has been added 25% by weight of bicomponent fibres. | 0.5-4 mm |
| Sample 2 (P2.1KS) | White cotton (from used bed sheets) to which has been added 25% by weight of bicomponent fibres. | Granulated used bed sheets result in fibres having homogenous appearance and an average fiber length of 0.5-4 mm. |
| Sample 3 (P3.1KS) | White cotton (from used bed sheets) to which has been added 25% by weight of bicomponent fiber and 2% by weight of a wetting agent (maleic anhydride polypropylene). | As above. |
| Sample 4 (P4.1KS) | White cotton (from used bed sheets) to which has been added 10% by weight of bicomponent fiber, 2% by weight of wetting agent and 18% by weight of recycled polyethylene | As above. |
| Sample 5 (P5.1KS) | Black wool (from waste woven piece goods) to which has been added 25% by weight of bicomponent fibres. | The granulated waste woven piece goods result in fibres having homogenous appearance and an average fiber length of 0.5-4 mm. |
| Sample 6 (P6.1KS) | Black wool to which has been added 25% by weight of bicomponent fiber and 2% by weight of wetting agent (maleic anhydride polypropylene). | As above. |
| Sample 7 (P7.1KS) | Black wool to which has been added 10% by weight of bicomponent fiber, 2% by weight of wetting agent and 18% by weight of recycled polyethylene. | As above. |
| Sample 8 | Brown wool to which has been added 25% by weight of bicomponent fiber | 0.5-4 mm |
| Sample 9 (P11.1KS) | Fiber mix of 50% white cotton (from used bed sheets) and 50% black wool to which has been added 25% by weight of bicomponent fibres. | 0.5-4 mm |
| Sample 10 (P13.1KS) | Sheep wool from spinning process to which has been added 20% by weight of bicomponent fibres. | Sheep wool has an average fiber length of 2,097 mm yet about 19% of the sheep wool fibres are 4.5-7.5 mm. |
| Sample 11 (P8.1KS) | Fiber mix of 50% sheep wool and 50% black wool to which has been added 20% by weight of bicomponent fibres. | 0.5-4 mm |
| Sample 12 P.18_KS | Mix of 50% Turquoise wool and 50% cork to which has been added 25% by weight of bicomponent fiber. | 0.5-4 mm. The cork was granulated to pieces each having a diameter of 3-10 mm. |

-continued

| Sample designation | Contents of product | Average fiber length |
|---|---|---|
| Sample 13 P.16_KS | Cotton (from jeans textile) to which has been added 25% by weight of bicomponent fiber. | The granulated waste jeans textile resulted in fibres having an average fiber length between 0.5 and 4 mm, specifically 1,134 mm, and a mean width of 21.9 micron. |
| Sample 14 (P.14.1KS) | Mixed fibres (remnants, waste and leftovers from the production of the above samples excluding wool and cork) to which has been added 5% bicomponent fibres | 0.5-4 mm |

The bicomponent fiber used for the above samples is AL-Adhesion-C-1.7 dtex, 6 mm, from ES fibervisions, Engdraget 22 DK-6800 Varde, Denmark. The bicomponent fibres comprise polyethylene and poly propylene with respective soft points of 124 C and 140 C and respective melting points of 130° C. and 162° C.

The recycled polyethylene used for the above samples was PE MD ROTA Black, ID 45796, from Aage Vestergaard Larsen A/S, Klostermarken 3 DK-9550 Mariager, Denmark.

Example 2-2: Effects of Material Composition on Fulfillment of MDF Standards

A number of the above samples, as pressed boards, were tested for swelling, internal bond, bending strength and mean modulus of elasticity for comparison with the standards required of MDF plates, and the results are displayed in the table below:

| Board_ID | Thickness (measured) [mm]/COV | | Density [kg/m3]/COV | | Swelling (EN 317 - 24 h) [%]/COV | | Bending strength (MOR) (EN 310) [MPa]/COV | | Modulus of elasticity (MOE) (EN 310) [MPa]/COV | |
|---|---|---|---|---|---|---|---|---|---|---|
| P2.1KS | 9.47 | 0.9 | 994.4 | 1.1 | 22.5 | 0.6 | 40.24 | 8.05 | 3705 | 10 |
| P3.1KS | 11.82 | 0.6 | 1061.3 | 0.5 | 24.6 | 1.4 | 27.67 | 4.7 | 2620 | 11 |
| P4.1KS | 9.4 | 0.7 | 1028.4 | 0.2 | 12.8 | 3.3 | 27.66 | 4.65 | 2687 | 5 |
| P5.1KS | 8.88 | 1.3 | 1194.7 | 0.2 | 1.9 | 0 | 36.75 | 1.13 | 2690 | 0 |
| P6.1KS | 10.14 | 2 | 1161 | 1 | 1.1 | 0 | 36.99 | 6.26 | 2423 | 4 |
| P7.1KS | 9.96 | 1 | 1152.1 | 0.7 | 1.1 | 0 | 29.05 | 4.25 | 1773 | 3 |
| P8.1KS | 9.73 | 8.5 | 1177.2 | 2.3 | 10.6 | 10 | 33.13 | 11.48 | 2014 | 7 |

Sample P8.1KS, comprising the mix of black wool (having short fibres) and sheep wool (having fibres longer than 4 mm, has much higher swelling than the sample P5.1KS having only short fibres. Thus there is a need for using short fibres and a homogenous distribution, i.e. low spreading, of fiber length.

The table further shows the good properties of wool (samples P5.1KS to P8.1KS) in relation to cotton (samples P2.1KS to P4.1KS) as regards swelling. In fact, all the wool samples fulfil the EN-622-5MDF and the EN-622-5MDF.H (for humid conditions) standard for swelling while none of the cotton samples fulfils the EN-622-5MDF.H standard and only sample P4.1KS of the cotton sample fulfils the EN-622-5MDF standard.

The result for sample P4.1KS further shows that the recycled polyethylene, and thereby presumably also virgin polyethylene, is beneficial to improving swelling properties as the other cotton samples which do not contain recycled polyethylene do not fulfil the requirements of the standard.

The table below further shows results for further samples as pressed boards

| Board_ID | Process description | Thickness (measured) [mm]/COV | | Density [kg/m3]/COV | | Swelling (EN 317 - 24 h) [%]/COV | | Internal Bond (EN 319) [MPa]/COV | | Bending Strength (MOR) (EN 310) [MPa]/COV | | Modulus of elasticity MOE (EN 310) [MPa]/COV | |
|---|---|---|---|---|---|---|---|---|---|---|---|---|---|
| P4.1KS/ P10.1KS | White cotton 100% + 2% WA + PE | 7.05 | 0.4 | 1017.9 | 2.8 | 11.3 | 2.3 | 1 | 11.7 | 26.87 | 11.22 | 2595 | 13 |
| P11.1KS | Black wool 50%/50% Cotton | 8.1 | 0.4 | 1059.3 | 1.7 | 13.3 | 3.4 | 0.68 | 9.2 | 29.56 | 8.65 | 2081 | 6 |

-continued

| Board_ID | Process description | Thickness (measured) [mm]/COV | | Density [kg/m3]/COV | | Swelling (EN 317 - 24 h) [%]/COV | | Internal Bond (EN 319) [MPa]/COV | | Bending Strength (MOR) (EN 310) [MPa]/COV | | Modulus of elasticity MOE (EN 310) [MPa]/COV | |
|---|---|---|---|---|---|---|---|---|---|---|---|---|---|
| P5.1KS/P12.1KS | Black 100% wool/wool | 7.72 | 0.4 | 936.3 | 0.4 | 14.8 | 1 | 0.13 | 8.2 | 17.08 | 31.27 | 1054 | 23 |
| P13.1KS | Sheep wool | 5.9 | 3.2 | 919.5 | 3.2 | 33.5 | 31.6 | Not tested | | 9.91 | 21.58 | 554 | 28 |
| P14.1KS | Mixed fibre | 7.37 | 2.2 | 977 | 7.1 | 4 | 35.4 | 0.94 | 6.9 | 33.7 | 5.43 | 1966 | 4 |

Of the above samples, only P4.1KS, P11.1KS and P14.1KS fulfil the requirements of the swelling, bending strength and internal bond standards for MDF plates. P13.1KS fails all these requirements, while P5.1KS fulfils the requirement for swelling, but not the other two.

The results further show that addition of the recycled polyethylene results in improved internal bond as sample P4.1KS has the highest internal bond.

From sample P11.1KS it ban be seen that this sample has improved swelling properties, when compared to the sample P2.1KS, due to the wool fibres inmixed with the cotton fibres.

Example 2-3: Effects of Material Composition on Hardness

A number of samples, as pressed boards, were tested for hardness according to Shore D (ISO 868), Brinell (EN 1534), and Scratch (SIS 839117), see the results in the table below:

| Board_ID | Material | Shore D - mean of 10 points | HB [N/mm²] | Scratch at 3 N and 5 N |
|---|---|---|---|---|
| P.8-2_KS | Wool + Wool | 61 | 42.02 | Visible scratch when light hits the plate and is reflected |
| P14.1KS/P.15_KS | Mixed fibre | 73 | 50.99 | Visible scratch when light hits the plate and is reflected |
| P.16_KS | Jeans | 72 | 44.99 | Visible scratch when light hits the plate and is reflected |
| P.17_KS | Sheep wool | 42 | 18.95 | Visible scratch when light hits the plate and is reflected |
| P.18_KS | Turquoise Wool/Kork | 68 | 29.28 | Visible scratch when light hits the plate and is reflected |

As can be seen from the table, the sheep wool has a significantly lower hardness than the other samples due to the presence of longer fibres.

Example 2-4: Ignitability

Fire testing was performed with single test single flame source according to EN ISO 11925-2 for the following samples as pressed boards.

| Sample number | Contents | Thickness (mm) | Density |
|---|---|---|---|
| 1 (corresponds to Sample 5 in example 2-1 excluding lanolin) | 80% wool + 20% bicomponent fibres. Covered with lanolin | 11.2 | 1145 |
| 2 (corresponds to Sample 5 in example 2-1 excluding Burnblock) | 80% wool + 20% bicomponent fibres. Covered with Burnblock ® | 7.1 | 1142 |
| 3 (corresponds to Sample 5 in example 2-1) | 80% wool + 20% bicomponent fibres. | 7.2 | 1086 |
| 4 (corresponds to Sample 9 in example 2-1) | Mixed wool and cotton + 20% bicomponent fibres. | 11.1 | 919 |
| 5 (corresponds to Sample 13 in example 2-1) | Cotton(Jeans) + 20% bicomponent fibres. | 8.4 | 1262 |
| 6 (corresponds to Sample 13 in example 2-1 excluding Burnblock) | Cotton (jeans) + 20% bicomponent fibres, coated with Burnblock ® | 8.5 | 1066 |

Burnblock® is a fire retardant marketed by BURNBLOCK ApS. Kgs Nytorv. 15, 1050 Copenhagen K, Denmark.

None of the samples ignited during the 30 seconds during which the flame was directed at the edge of the sample. There further were no burning droplets.

Example 2-5: Influence of Fiber Direction on Mechanical Properties

The table below shows the bending strength of various samples as pressed boards having different fiber directions.

| Board_ID | Material | Process description | Control | Thickness (nom.) [mm] | Thickness (measured) [mm]/COV | | MOR (EN 310) [MPa]/COV | | MOE (EN 310) [MPa]/COV | |
|---|---|---|---|---|---|---|---|---|---|---|
| PB3KS | Cotton (Sample 2 in Example 2-1) | Parallel direction | Automatic | 9 | 8.73 | 1.25 | 36.91 | 6.38 | 4123 | 10 |
| PB4KS | Cotton (Sample 2 in Example 2-1) | orthogonal direction | Automatic | 9 | 8.68 | 0.41 | 19.01 | 5.09 | 2126 | 14 |

-continued

| Board_ID | Material | Process description | Control | Thickness (nom.) [mm] | Thickness (measured) [mm]/COV | | MOR (EN 310) [MPa]/COV | | MOE (EN 310) [MPa]/COV | |
|---|---|---|---|---|---|---|---|---|---|---|
| PU2KS | Wool (Sample 5 in Example 2-1) | Parallel direction | Automatic | 9 | 8.26 | 0.29 | 22.72 | 8.35 | 1323 | 10 |
| PU3KS | Wool (Sample 5 in Example 2-1) | orthogonal direction | Automatic | 9 | 8.2 | 1.25 | 26.38 | 6.04 | 1515 | 6 |

Of the above samples, PB3KS, PU3KS filfil the EN 310 bending strength requirement for MDF according to the EM 622-5 MDF standard, while only PB3KS fulfils the bending strength required by the EN 622-6 MDF.H standard.

Example 2-6: Effects of Coating Products Produced by the Method According to the Present Invention The following samples, as pressed plates of approximately 8 mm thickness, were tested:

| Sample | Coating | Swelling % thickness after 24 hours |
|---|---|---|
| P2.1KS | Oil | 21.4 |
| P2.1KS | Oil | 21.2 |
| P2.1KS | Wax | 22.2 |
| P2.1KS | Wax | 21.8 |
| P2.1KS | Lacquer | 21.5 |
| P2.1KS | Lacquer | 22.2 |
| P3.1KS | Oil | 22.8 |
| P3.1KS | Oil | 22.6 |
| P3.1KS | Wax | 24.8 |
| P3.1KS | Wax | 24.8 |
| P3.1KS | Lacquer | 23.6 |
| P3.1KS | Lacquer | 23.3 |
| P4.1KS | Oil | 5.7 |
| P4.1KS | Oil | 2.2 |
| P4.1KS | Wax | 12.0 |
| P4.1KS | Wax | 12.6 |
| P4.1KS | Lacquer | 0.1 |
| P4.1KS | Lacquer | 0.1 |
| P5.1KS | Oil | 0.3 |
| P5.1KS | Oil | 0.8 |
| P5.1KS | Wax | 2.4 |
| P5.1KS | Wax | 2.1 |
| P5.1KS | Lacquer | 0.0 |
| P5.1KS | Lacquer | 0.2 |
| P6.1KS | Oil | 0.1 |
| P6.1KS | Oil | 0.0 |
| P6.1KS | Wax | 1.2 |
| P6.1KS | Wax | 1.6 |
| P6.1KS | Lacquer | 0.0 |
| P6.1KS | Lacquer | −0.1 |
| P7.1KS | Oil | 0.3 |
| P7.1KS | Oil | 0.4 |
| P7.1KS | Wax | 1.2 |
| P7.1KS | Wax | 1.3 |
| P7.1KS | Lacquer | 0.0 |
| P7.1KS | Lacquer | −0.1 |

The wax used was "Nordin Voks" from Farvefabrikken Skovgaard & Frydensberg Gadestaevnet 6-8, 2650 Hvidovre, Denmark.

The oil used was "Junckers Rustic BordpladeOlie klar" a hardening urethane oil from Junckers Industrier A/S, Vaerftsvej 4, 4600 Køage, Denmark.

The lacquer used was Plastofix 96RF 52156, which is a 2 component acid hardening lacquer comprising alkyde, melamin resin and cellulose nitrate from Akzo Nobel, Holmbladsgade 70, DK2300 Copenhagen S, Denmark.

As can be seen from the table above, samples P2.1KS and P3.1KS have equally high swelling regardless of coating method, while sample P4.1KS generally obtains lower swelling, and in particular a good low result is seen if coated by lacquer.

In contrast to the cotton samples, i.e. P2.1KS-P4.1KS, the wool samples, i.e. P5.1KS-P7.1KS, provide much lower swelling, especially if coated with lacquer.

Example 2-7: $1^{st}$ and $2^{nd}$ Generation Products

Test were carried out where a product produced by the method according to the present invention was used as used woven or knitted textile for producing a new product, i.e. a $1^{st}$ generation product (closed loop#1), and where this $1^{st}$ generation product was used to make a new $2^{nd}$ generation product (closed loop#2).

| Board_ID | Material | Process description | Thickness (measured) [mm]/COV | | Bending strength (MOR) (EN 310) [MPa]/COV | | Modulus of elasticity (MOE) (EN 310) [MPa]/COV | |
|---|---|---|---|---|---|---|---|---|
| B.1 | Cotton (Sample 2 in Example 2-1) | 170° C. STD PRG. | 8.84 | 0.7 | 36.58 | 12.23 | 4067 | 11 |
| P9.8KS | Wool (Sample 5 in Example 2-1) | 170° C. STD PRG. | 8.15 | 0.3 | 47.21 | 7.38 | 2464 | 11.1 |
| P37.3 KS | Wool (Sample 5 in Example 2-1) | Closed loop #1 | 9.9 | — | 49.47 | — | 2633 | — |
| P40 KS | Wool (Sample 5 in Example 2-1) | Closed loop #2 | 8.5 | — | 38.48 | — | 2647 | — |

-continued

| Board_ID | Material | Process description | Thickness (measured) [mm]/COV | | Bending strength (MOR) (EN 310) [MPa]/COV | | Modulus of elasticity (MOE) (EN 310) [MPa]/COV | |
|---|---|---|---|---|---|---|---|---|
| P38.3 KS | Cotton (Sample 2 in Example 2-1) | Closed loop #1 | 10.3 | — | 11.8 | — | 1588 | — |
| P41 KS | Cotton (Sample 2 in Example 2-1) | Closed loop #2 | 8.5 | — | 23.31 | — | 3399 | — |
| P39.3 KS | Cotton + Wool (Sample 9 in Example 2-1) | Closed loop #1 | 9.7 | — | 18.15 | — | 1743 | — |
| P42 KS | Cotton + Wool (Sample 9 in Example 2-1) | Closed loop #2 | 9.8 | — | 37.15 | — | 3226 | — |

The samples B.1 and P9.8KS are included for reference.

As can be seen from the table, the $2^{nd}$ generation wool product sample P40 KS has a somewhat lower bending strength than the first generation wool sample P37.3KS. For cotton however the bending strength actually increases between the first generation sample P 38.3 KS and the second generation sample P 41 KS. An increase in bending strength is also seen between the $1^{st}$ generation cotton+wool sample P39.3 KS and the $2^{nd}$ generation cotton+wool sample.

Example 2-8: Addition of 3% Glass Fibres

Tests were carried out for measuring bending strength dependent on the addition of 3% glass fibres for samples as pressed boards. The results are shown in the table below (samples B.1 and P9.8KS serving as reference:

| Board_ID | Material | Process description | Thickness (measured) [mm]/COV | | Bending strength (MOR) (EN 310) [MPa]/COV | | Modulus of elasticity (MOE) (EN 310) [MPa]/COV | |
|---|---|---|---|---|---|---|---|---|
| B.1 | Cotton (Sample 2 in Example 2-1) | 170° C. STD PRG. | 8.84 | 0.7 | 36.58 | 12.23 | 4067 | 11 |
| P9.8KS | Wool (Sample 2 in Example 2-1) | 170° C. STD PRG. | 8.15 | 0.3 | 47.21 | 7.38 | 2464 | 11.1 |
| P45 KS | Black and brown wool (50/50 mix of samples 5 and 8 in Example 2-1) | Without glass fibre | 9 | 0.1 | 29.41 | 30 | 1822 | 24 |
| P46 KS | Black and brown wool (50/50 mix of samples 5 and 8 in Example 2-1) | With glass fibre | 8.8 | 0.9 | 36.53 | 19 | 2113 | 9 |
| P47 KS | Cotton (Sample 2 in Example 2-1) | Without glass fibre | 9.0 | 0.5 | 24.93 | 12 | 2468 | 17 |
| P48 KS | Cotton (Sample 2 in Example 2-1) | With glass fibre | 9.65 | 0.7 | 28.94 | 25 | 2644 | 16 |

The glass fibre reinforcement used in the above samples was the "UNIFORM GYPSUM Wet Used Chopped Strands" from UCOMPOSITES A/S, Bakkedraget 5 4793 Bogø, Denmark, The diameter of the filaments was 17 micron and the length was 6.3 mm (¼").

As can be seen from the table, the samples with added glass fibre have slightly higher bending strength. Of the samples P45 KS-P48 KS, all except P47 KS fulfil the requirements for binding strength of the EN 622-5 MDF standard.

Example 2-9: Multiple Layer Sandwich

A single sample made up of 10 layers from 5 different sources of used woven or knitted textile, the layers being from one side to the other. Black wool—Mixed—Cotton (Jeans)—Brown wool—Cotton (white)—Brown wool—Cotton (white)—Cotton (Jeans)—Mixed—Black wool.

The table below shows the test results for this sample:

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| P23.1 KS | Mixed materials as above | 18.35 | 0.1 | 1142.9 | 0.6 | 17.3 | 4.1 | 0.25 | 19.7 | 36.95 | 7.05 | 2411 | 21 |

This sample fulfilled the requirement for bending strength for the EN 622-5 MDF standard, but not the requirements for swelling and internal bond.

Example 2.10: Different Press and Heating Programmes

The table below details samples pressed to a nominal thickness of 9 mm in a standard pressing program at 170° C. defined by FIGS. 11 (B.1 Cotton) and 12 (P9.8KS Wool).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.8KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |

As can be seen from FIG. 11, the initial thickness of the nonwoven mat comprising cotton used woven or knitted textile before pressing was about 20 mm, and the final thickness was 9 mm. The pressing time was about 28 minutes. In the FIGS. 11-18 the temperature is the temperature measured in the middle of each sample during pressing. Further, in FIGS. 11-18, the position shown in the figures is the position of the moving pressure plate of the flat press used, this position being the same as the thickness of the sample.

As can be seen from FIG. 12, the initial thickness of the nonwoven mat comprising wool used woven or knitted textile before pressing was about 20 mm and the final thickness was 9 mm. The pressing time was about 22 minutes.

The table below details samples pressed to a nominal thickness of 9 mm in a quick pressing program at 170° C. aimed at pressing at twice the speed of the standard program. The quick program is defined by FIGS. 13 (P9.3KS Cotton) and 14 (P9.7KS Wool).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending Strength (MOR) (EN 310) [MPa]/COV | | Modulus of elasticity (MOE) (EN 310) [MPa]/COV | |
|---|---|---|---|---|---|---|---|---|---|---|---|---|---|
| P9.3 KS | Cotton (Sample 2 in Example 2-1) | 9.17 | 0.4 | 1104.4 | 0.4 | 26.6 | 2.8 | 0.43 | 8.7 | 30.55 | 8.64 | 3691 | 8 |
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.7 KS | Wool (Sample 5 in Example 2-1) | 8.31 | 0.3 | 1114.3 | 2.1 | 2.9 | 15.4 | 0.73 | 34.7 | 42.49 | 8.97 | 2553 | 8 |
| P9.8 KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |

In the above table samples, B.1 and P9.8KS at standard temperature and pressing time have been included for reference.

The table below details samples pressed to a nominal thickness of 9 mm at a temperature of 200° C. and at half the time of the standard program. The program is defined by FIGS. 15 (P9.2KS Cotton) and 16 (A1.1 Wool).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.2 KS | Cotton (Sample 2 in Example 2-1) | 9.05 | 0.2 | 1125.5 | 1.3 | 19 | 11.1 | 0.51 | 4.4 | 37.74 | 6.21 | 3997 | 7 |
| P9.8 KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |
| A1.1 | Wool (Sample 5 in Example 2-1) | 8.34 | 0.8 | 963.3 | 0.9 | 4 | 6.3 | 0.71 | 32.3 | 41.97 | 11.01 | 1903 | 12 |

In the above table, samples B.1 and P9.8KS at standard temperature and pressing time have been included for reference.

The table below details three mats pressed to plates with a nominal thickness of 13.5 mm in a standard program at 170° C. The standard program is defined by FIGS. 17 (P9.4KS Cotton) and 18 (P9.8KS).

| Board_ID | Material | Thickness (measured) [mm]/COV | | Density [kg/m3]/COV | | Swelling (EN 317 - 24 h) [%]/COV | | Internal Bond (EN 319) [MPa]/COV | | Bending strength (MOR) (EN 310) [MPa]/COV | | Modulus of elasticity (MOE) (EN 310) [MPa]/COV | |
|---|---|---|---|---|---|---|---|---|---|---|---|---|---|
| P9.4 KS | Cotton (3 mats of Sample 2 in Example 2-1) | 15.73 | 1.5 | 971.9 | 0.5 | 28.4 | 3 | 0.27 | 2.6 | 23.29 | 2.08 | 2786 | 3 |
| B.1 | Cotton (Sample 2 in Example 2-1) | 8.84 | 0.7 | 1024.8 | 0.4 | 24.2 | 0.2 | 0.39 | 3.1 | 36.58 | 12.23 | 4067 | 11 |
| P9.6 KS | Wool (3 mats of Sample 5 in Example 2-1) | 13.99 | 0.7 | 926.6 | 0.5 | Not tested | Not tested | 0.18 | 38 | Not tested | Not tested | Not tested | Not tested |
| P9.8 KS | Wool (Sample 5 in Example 2-1) | 8.15 | 0.3 | 1039.3 | 1.9 | 1.7 | 20.4 | 0.77 | 17.6 | 47.21 | 7.38 | 2464 | 11.1 |

In the above table, samples B.1 and P9.8KS pressed to a nominal thickness of 9 mm at standard temperature and pressing time have been included for reference.

From the figures it can be seen that the time during which the temperature in the middle if the samples is above 160° C. is longer for cotton than wool.

However, the wool plate has better properties.

Running the pressing at half the time results in a shorter time during which the middle of the sample is above 160° C. However, the samples produced using half the time are good enough.

Running a high temperature program increases the properties for the sample comprising cotton, while it slightly decreases the properties for the sample comprising wool.

When running samples comprises several layers, additional time and/or higher temperatures are needed if the temperature in the middle of the samples is to be maintained above 160° C. for sufficient amount of time.

In the below examples 3 to 5, the tested samples have been produced similarly to sample (P2.1KS), see example 2-2 above, however with the difference that the used woven or knitted textile was granulated to fibres having an average fiber length of 3.5 mm to 5.5 mm.

Example 3: Different Proportions of Textile (Cotton) and Binder

Five different test samples were made with varying proportions of used textile (cotton) and fiber based binder (bicomponent—BICO—fibres). The samples are listed in the table below.

| Sample [% textile fibres/% BICO fibres] | Thickness | Date | Sample no. |
|---|---|---|---|
| 1. 75%/25% | 8 mm | 17 Mar. 2015 | P.53_KS |
| 2. 71%/29% | 8 mm | 17 Mar. 2015 | P.54_KS |
| 3. 67%/33% | 8 mm | 17 Mar. 2015 | P.55_KS |
| 4. 63%/37% | 8 mm | 17 Mar. 2015 | P.56_KS |
| 5. 59%/41% | 8 mm | 17 Mar. 2015 | P.57_KS |

The table below shows the test results of samples 1-5, in terms of mean values, with the bottom row used for comparison with a board where the proportion was 80% textile (cotton) fibres and 20% bicomponent fibres.

| Sample | Sample no. | Measured Thickness [mm] | Before test Density [kg/m3] | EN 317 Swelling [%] | EN 310 MOR [MPa] | EN 310 MOE [MPa] |
|---|---|---|---|---|---|---|
| 1. (75%) | P.53_KS | 8.66 | 1087.7 | 15.6 | 42.31 | 3137 |
| 2. (71%) | P.54_KS | 9.04 | 1069.5 | 13.5 | 45.45 | 3135 |
| 3. (67%) | P.55_KS | 8.45 | 1123.3 | 8 | 60.04 | 4165 |
| 4. (63%) | P.56_KS | 8.57 | 1134.7 | 5.2 | 53.05 | 3557 |
| 5. (59%) | P.57_KS | 6.26 | 1168.9 | 2 | 62.49 | 3995 |
| 80% cotton/20% BICO | | 8.84 | 1024.8 | 24.2 | 36.58 | 4067 |

As before, MOR refers to strength, and MOE refers to the stiffness/elasticity module.

When considering sample 1, if can determined that adding 5% mm plastic to the composition of the material improves the mechanical properties in terms of swelling and strength when comparing to the 80%/20% sample.

The swelling properties have been decreased from 24.2% to 15.6%, which portrays an improvement of the material.

The strength of the material has been increased from 36.58 MPa to 42.31 MPa, which also shows an improvement of the material.

The stiffness of the material has not improved. It has been decreased from the before of 4067 to 3137 MPa.

When considering sample 2, it can be determined that adding 9% more plastic to the composition of the material improves the mechanical properties in terms of swelling and strength when comparing to the 80%/20% sample.

The swelling properties have been decreased from 24.2% to 13.5%, which portrays an improvement of the material.

The strength of the material has been increased from 36.58 MPa to 48.45 MPa, which also shows an improvement of the material, though a slight improvement compared to Sample 1.

The stiffness of the material has not improved. It has been decreased from the before of 4067 to 3135 MPa.

When considering sample 3, it can be determined that adding 13% more plastic to the composition of the material improves the mechanical properties in terms of swelling, strength and stiffness, when compared to the 80%/20% sample.

The swelling properties have been decreased from 24.2% to 8%, which portrays a significant improvement of the material, and which indicates a larger improvement compared to Sample 1 and Sample 2.

The strength of the material has been increased from 36.58 MPa to 60.04 MPa, which also shows a significant improvement of the material, which indicates a larger improvement compared to Sample 1 and Sample 2.

The stiffness of the material has slightly improved. It has been increased from the before of 4067 to 4165 MPa.

When considering sample 4, it can be determined that adding 17% more plastic to the composition of the material improves the mechanical properties in terms of swelling and strength, when compared to the 80%/20% sample.

The swelling properties have been decreased from 24.2% to 5.2% which portrays a significant improvement of the material, and which indicates a larger improvement compared to Sample 1 and Sample 2, and a bit better than Sample 3.

The strength of the material has been increased from 36.58 MPa to 53.05 MPa, which also shows a significant improvement of the material, and which indicates a larger improvement compared to Sample 1 and Sample 2, but less improvement compared to Sample 3.

The stiffness of the material has not improved. It has been decreased from the before of 4067 to 3557 MPa. For the properties of stiffness, the results of Sample 4 are somewhat the same as for Sample 1 and Sample 2.

When considering sample 5, it can be determined that adding 21% more plastic to the composition of the material improves the mechanical properties in terms of swelling and strength, when compared to the 80%/20% sample.

The swelling properties have been decreased from 24.2% to 2%, which portrays a significant improvement of the material, and which indicates a larger improvement compared to Sample 1, Sample 2 and Sample 3, and a bit better than Sample 4.

The strength of the material has been increased from 36.58 MPa to 62.49 MPa, which also shows a significant improvement of the material, which indicates a larger improvement compared to all previous Samples (1,2,3 & 4), though the strength for Sample 3 is almost as high as for Sample 5.

The stiffness of the material has not improved. It has been decreased from the before of 4067 to 3995 MPa, though the stiffness is higher than for Sample 1, Sample 2 and Sample 4, but closer to Sample 3. This slight decrease of stiffness indicates a similar property in stiffness as before.

Example 4: Different Proportions of Textile (Cotton), Binder and Coupling Agent (MAPE)

For the following tests the coupling agent used was Maleic Anhydride PolyEthylene (MAPE); product name: Polyethylene-graft-maleic anhydride, viscosity 500 cP, by Sigma-Aldrich. The coupling agent was mixed with the granulated textile fibres and the mats were heated to 140° C. prior to pressing to ensure a tight bonding of the fibres. The mixing of MAPE with the textile fibres went easy and without complications. The processing showed compatibility between cotton and MAPE.

The table below shows the collected samples 6 to 8 made from the cotton-textile fibres, plastic fibres (BICO) and MAPE fibres; they are sample-numbered with descriptions of the content and thickness. The samples were made in the same way as samples 1-5 of example 3 above, however, with the addition of the steps of mixing with coupling agent and heating as described above.

| Sample [% textile fibres/ % BICO fibres/% MAPE fibres] | Thickness | Date | Sample no. |
|---|---|---|---|
| 6. 75%/22%/3% | 8 mm | 17 Mar. 2015 | P.59_KS |
| 7. 67%/30%/3% | 8 mm | 17 Mar. 2015 | P.62_KS |
| 8. 63%/34%/3% | 8 mm | 17 Mar. 2015 | P.44_KS |

The test results far Sample 6, Sample 7 and Sample 8 can be seen in the table below.

| Sample | Sample no. | Measured Thickness [mm] | Before test Density [kg/m3] | EN 317 Swelling [%] | EN 310 MOR [MPa] | EN 310 MOE [MPa] |
|---|---|---|---|---|---|---|
| 6. (75%) | P.59_KS | 8.48 | 962.1 | 13 | 35.5 | 2702 |
| 7. (67%) | P.62_KS | 8.13 | 970.6 | 11.1 | 41.54 | 2985 |
| 8. (63%) | P.44_KS | 8.49 | 1067.4 | 0.8 | 52.89 | 3206 |
| 80% cotton/20% BICO | | 8.84 | 1024.8 | 24.2 | 36.58 | 4067 |

When comparing the results from Sample 6, Sample 7 and Sample 8 to the 80%/20% sample. It can be determined that adding a coupling agent (MAPE) to the composition of the material together with more plastic fibres improves the mechanical properties in terms of swelling and strength.

The swelling properties have been considerably improved by the addition of MAPE, since Sample 6 has a swelling value of 13%, Sample 7 has 11.1% and Sample 8 has 0.8%, whereas before the swelling properties were as high as 24.2%. This indicates that using a coupling agent in the composition allows the sample to repel water or liquids better, which is a property that is desired in the product according to the present invention.

The strength of the material has been increased from 36.58 MPa to 35.5 MPa for Sample 8 and 41.54 MPa for Sample 7, which shows minor improvements. On the other hand, when comparing to Sample 8, the improvement has increased to 52.89 MPa, which shows a significant improvement of the material.

The stiffness of the material has not improved. On the contrary, the stiffness for Sample 6, Sample 7 and Sample 8 is less than the 80%/20% sample.

After the tests, it can therefore be concluded that, compared to the 80%/20% sample, the new compositions with added MAPE have improved mechanical properties when considering swelling and strength, though Sample 8 has the preferable performance compared to Sample 6 and Sample 7. These improved swelling properties are desired in the product according to the present invention because a board should repel water or liquids as much as possible. This property has been improved with increased plastic content and the addition of MAPE.

Example 5: Different Proportions of Textile (Wool) and Binder

The table below shows the samples 9 and 10 made from the used wool-textile fibres and plastic fibres (BICO).

| Sample [% textile fibres/% BICO fibres] | Thickness | Date | Sample no. |
| --- | --- | --- | --- |
| 9. 80%/20% | 8 mm | 17 Mar. 2015 | P.64_KS |
| 10. 63%/37% | 8 mm | 17 Mar. 2015 | P.47_KS |

The test results for Sample 9 and Sample 10 can be seen in the table below

| Sample | Sample no. | Measured Thickness [mm] | Before test Density [kg/m3] | EN 317 Swelling [%] | EN 310 MOR [MPa] | EN 310 MOE [MPa] |
| --- | --- | --- | --- | --- | --- | --- |
| 9. (80%) | P.64_KS | 8.15 | 1039.3 | 1.7 | 47.21 | 2464 |
| 10. (63%) | P.47_KS | 8.19 | 1070.5 | 3.7 | 39.75 | 2172 |

Surprisingly, the increase in plastic content does not increase the mechanical properties of swelling, strength and stiffness when considering how Sample 9 performs better than Sample 10 in all of the parameters. Therefore, increasing the amount of plastic does not improve these properties.

The results of the above examples 3-5 have been compared to the requirements for MDF in the table below.

Surprisingly, the products according to the present invention perform better than MDF in all parameters for all samples, except for sample 9 and 18 (stiffness), thus proving that the products according then the present invention may serve as replacement or substitute for MDF. In particular, as is clear from the table, a MDF board of equivalent thickness has lower test results for swelling, strength, and stiffness.

| Materials | Swelling [%] | MOR [MPa] | MOE [MPa] |
| --- | --- | --- | --- |
| MDF 6-9 mm | 17 | 23 | 2700 |
| Sample 1 (75%) | 15.6 | 42.31 | 3137 |
| Sample 2 (71%) | 13.5 | 45.45 | 3135 |
| Sample 3 (67%) | 8 | 60.04 | 4165 |
| Sample 4 (63%) | 5.2 | 53.05 | 3557 |
| Sample 5 (59%) | 2 | 62.49 | 3995 |
| Sample 6 (75% + 3%) | 13 | 35.5 | 2702 |
| Sample 7 (67% + 3%) | 11.1 | 41.54 | 2985 |
| Sample 8 (63% + 3%) | 0.8 | 52.89 | 3206 |
| Sample 9 (80%) | 1.7 | 47.21 | 2464 |
| Sample 10 (63%) | 3.7 | 39.75 | 2172 |

As before, MOR refers to strength, and MOE refers to the stiffness/elasticity module.

As mentioned above, Sample 9 and Sample 10, which are comprised of wool textile fibres, have lower values regarding the stiffness.

Surprisingly, the strength and stiffness of the cotton samples (samples 1-5) reach the highest values for the range of 59- to 67% textile fibres (samples 3-5) despite the expectation that a lower proportion of textile fibres would decrease stiffness. This range further gives good values for swelling, e.g. less than half of that of MDF, thus providing an advantageous range for the proportion of cotton textile fibres.

Of this range, especially samples 4 and 5, i.e. the range of 63% to 67% cotton, show very advantageous values as regards the properties swelling, strength and stiffness. As regards wool, on the other hand, the proportion of textile fibres should be at least 80%, as smaller proportions, see sample 10, have worse properties.

Even further advancements in decreasing swelling are obtainable by the addition of the coupling agent (MAPE), while still surpassing the MDF board as regards the properties mechanical strength and stiffness.

Surprisingly, the addition of the coupling agent to sample 1, with 75% textile fibres (sample 6), results only in a small decrease in swelling, and the addition of the coupling agent to sample 2 (see sample 7) actually increases swelling, while the same addition to sample 4 (see sample 8) decreases swelling 6.5 limes to the lowest value. Thus there appears to exist a synergic effect between the coupling agent and the proportion of textile fibres/plastic.

Another surprising result is that comparable low swelling properties of the wool samples can be obtained using the cheaper cotton textile fibres when combined with the coupling agent, see samples 8 and 10, while still maintaining mechanical properties that are superior to those of the wool samples.

LIST OF REFERENCE NUMBERS

In the following is given a list of reference numbers that are used in the detailed description of the invention.

2 flow diagram of a method according to the invention,
4 method step of collecting used woven or knitted textile,
6 method step of cutting used woven or knitted textile into pieces,
8 method step of granulating the used woven or knitted textile,
10 method step of mixing textile fibres and binder,
12 method step of forming a nonwoven mat,
14 method step of placing the nonwoven mat in a three-dimensional mould or flat press,
16 method step of pressing the nonwoven mat in the three-dimensional mould or flat press,
18 method step of cutting or grinding off excess material of the finished product,
20 measurement setup,
22 test sample,
24 measurement tube,
26 speaker,
28, 30 microphones,
32, 38 amplifier,
34 Fast Fourier Transformer,
36 computer, and
38 printer,
40 Base mat
42 first portion
44 second portion
46 third portion
48f fourth portion
50 fifth portion
52 sixth portion
54 seventh portion
56 eight portion
60 acoustic sheet
62 hard layer
64 soft sound absorbing layer

The invention claimed is:

1. A method of manufacturing a product from used woven or knitted textile comprising vegetable or animal fibers, the method comprising the steps of:
   collecting different types of used woven or knitted textiles into a least first and second textile collections, said first and second textile collections being different from each other by having different types of used woven or knitted textile,
   granulating said first and second textile collections into fibers having an average fiber length of between 3.5 mm and 5.5 mm,
   separately mixing each of said granulated first and second textile collections said with a thermoplastic fiber based binder and a coupling agent to form first and second mixtures, respectively, and
   forming a nonwoven mat from the first and second mixtures,
   wherein said nonwoven mat comprises 59% to 67% by weight of vegetable fiber, or alternatively said nonwoven mat comprises at least 80% by weight animal fibers,
   wherein the step of forming said nonwoven mat comprises substeps of:
      forming at least one first precursor nonwoven mat from said first mixture and at least one second precursor nonwoven mat from said second mixture, and
      arranging said at least one first precursor nonwoven mat and said at least one second precursor nonwoven mat on top of each other to form said nonwoven mat, and
   wherein said method further comprises the step of:
      heating said nonwoven mat to at least 140° C., and
   wherein said nonwoven mat comprises about 3% by weight of the coupling agent.

2. The method according to claim 1, said coupling agent being Maleic Anhydride Polyethylene (MAPE).

3. The method according to claim 1, further comprising the steps of:
   placing said nonwoven mat in a preheated three-dimensional mold or a flat press, and
   pressing said nonwoven mat into a product having a shape determined by the shape of said three-dimensional mold or the flat press.

4. The method according to claim 3, wherein 50% to 90% by weight of said fiber based thermoplastic binder is made up of a recycled polypropylene plastic.

5. The method according to claim 3, further comprising the step of:
   positioning a plastic film between said nonwoven mat and said three-dimensional mold or flat press prior to said pressing.

6. The method according to claim 3, said pressing being performed at a temperature between 160 to 200° C. at a pressure of 40-100 ton/m$^2$ for 5-15 minutes.

7. The method according to claim 3, wherein said preheated three-dimensional mold or flat press comprises first and second complimentary shaped mold or press parts for defining said shape.

8. The method according to claim 1, wherein said first and second textile collections comprise used woven or knitted cotton textile or used woven or knitted wool textile selected from any of: trimmings, end pieces, faulty sections, experimental pieces and rejected pieces from the textile industry, used textiles, used clothes, used bed linens, used towels, used work uniforms, used upholstery, or used curtains.

9. The method according to claim 1, further comprising the steps of:
   collecting at least a piece of the nonwoven mat manufactured or remanufactured by the method, or at least a piece of a product manufactured by the method,
   granulating said piece into fibers having an average fiber length of between 3.5 mm and 5.5 mm, and
   mixing said granulated piece with said granulated first and second textile collections.

10. The method according to claim 1, wherein at least one of said precursor nonwoven mats is pressed separately by performing the steps of:
    placing at least one of said precursor nonwoven mats in a preheated three-dimensional mold or a flat press, and
    pressing at least one of said precursor nonwoven mats into a pressed mat having a shape determined by the shape of said three-dimensional mold or the flat press,
    before said pressed mat is arranged with other precursor nonwoven mats, at least one of said precursor nonwoven mats is pressed to a density which is different from the density of at least one of the other precursor nonwoven mats.

11. The method according to claim 10, further comprising the steps of:
    placing said precursor nonwoven mats having different densities in a preheated three-dimensional mold or a flat press, and pressing said precursor nonwoven mats into a product having a shape determined by the shape of said three-dimensional mold or the flat press.

12. The method according to claim 1, wherein each of said first and second textile collections comprises a mixture of wool and cotton, a mixture of different wools, and/or a mixture of different cottons.

13. The method according to claim 1, wherein:
the step of collecting said different types of used woven or knitted textiles comprises substeps of:
collecting a first amount of used woven or knitted textile comprising a majority of cotton, and
collecting a second amount of used woven or knitted textile comprising a majority of wool.

14. The method according to claim 1, further comprising the step of:
coating said product with a wax, oil or lacquer.

15. The method according to claim 1, further comprising the step of:
affixing a print, optionally through silk screen printing, to said product.

16. The method according to claim 1, further comprising the step of cutting said collected used woven or knitted textile into pieces having a maximal length of 30 cm and a maximal width of 30 cm before commencing the step of granulating said first and second textile collections.

17. The method according to claim 1, wherein the granulated textile fibers have an average length of between 3.5 and 4.5 mm.

18. The method according to claim 1, wherein the fibers of thermoplastics have an average length between 1 mm and 15 mm.

19. The method according to claim 1, wherein the fibers of thermoplastics are at least in part manufactured from reused plastics.

20. The method according to claim 1, wherein the fibers of thermoplastics are manufactured from renewable natural resources.

21. The method according to claim 1, wherein the fibers of thermoplastics are manufactured from biodegradable plastics.

22. The method according to claim 21, wherein each of the plastic fibers comprises a mixture of biodegradable plastics and conventional plastics.

23. The method according to claim 22, wherein the biodegradable plastics constitutes at least 70% per weight of said mixture.

24. The method according to claim 23, wherein said mixture comprises at least 70% per weight of fibers made from biodegradable plastics and the remainder being fibers made from conventional plastics.

25. The method according to claim 1, wherein each of the thermoplastic fibers comprises a core formed by a first type of plastic and a cladding surrounding the core, which cladding is formed by a second type of plastic, said first type of plastic having a significantly higher melting point than said second type of plastic.

26. The method according to claim 25, wherein the first type of plastic has a melting point which is between 30° C. and 80° C. higher than the melting point of the second type of plastic.

27. The method according to claim 25, wherein the first type of plastic has a melting point of between 100° C. and 140° C.

28. The method according to claim 25, wherein the second type of plastic has a melting point of between 150° C. and 200° C.

29. The method according to claim 1, wherein the step of forming the nonwoven mat from the first and second mixtures comprises a substep of heating said mixtures to a temperature of between 100° C. and 140° C.

30. The method according to claim 29, further comprising a substep of dry forming the precursor mats by blowing the first and second mixtures into a forming head disposed above a forming wire prior to or simultaneously to heating said mixture.

31. The method according to claim 30, further comprising a substep of blowing at least one of said first and second mixtures into a forming head placed above a vacuum box disposed on the forming wire where the at least one of said first and second mixtures is deposited and held by a vacuum.

32. The method according to claim 1, wherein at least one of said first and second precursor nonwoven mats is formed using air laying.

33. The method according to claim 1, wherein the step of granulating the first and second textile collections comprises a substep of processing said first and second textile collections using a rasper and/or fine granulator.

* * * * *